United States Patent
Sugiyama et al.

(10) Patent No.: US 9,285,233 B2
(45) Date of Patent: *Mar. 15, 2016

(54) DISPLAY CONTROL APPARATUS

(75) Inventors: Hitoshi Sugiyama, Anjo (JP); Shigeo Kato, Kariya (JP); Yoshihiro Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/127,713

(22) PCT Filed: Aug. 9, 2012

(86) PCT No.: PCT/JP2012/005080
§ 371 (c)(1),
(2), (4) Date: Dec. 19, 2013

(87) PCT Pub. No.: WO2013/021654
PCT Pub. Date: Feb. 14, 2013

(65) Prior Publication Data
US 2014/0114531 A1    Apr. 24, 2014

(30) Foreign Application Priority Data

| Aug. 11, 2011 | (JP) | 2011-173033 |
| Sep. 8, 2011 | (JP) | 2011-196098 |
| Dec. 28, 2011 | (JP) | 2011-288063 |
| Dec. 28, 2011 | (JP) | 2011-288064 |
| Jul. 25, 2012 | (JP) | 2012-164976 |
| Jul. 25, 2012 | (JP) | 2012-164977 |
| Aug. 8, 2012 | (JP) | 2012-176321 |
| Aug. 8, 2012 | (JP) | 2012-176322 |

(51) Int. Cl.
*G01C 21/36* (2006.01)
*B60K 35/00* (2006.01)
(Continued)

(52) U.S. Cl.
CPC ............ *G01C 21/3602* (2013.01); *B60K 35/00* (2013.01); *H04N 21/472* (2013.01); *B60K 2350/1096* (2013.01); *B60K 2350/352* (2013.01); *G06F 5/00* (2013.01)

(58) Field of Classification Search
CPC .. G01C 21/3602; H04N 21/472; B60K 35/00; B60K 2350/1096; B60K 2350/352; G06F 5/00
See application file for complete search history.

(56) References Cited

U.S. PATENT DOCUMENTS

| 5,757,268 A | 5/1998 | Toffolo et al. |
| 6,710,789 B1 | 3/2004 | Sekiguchi et al. |

(Continued)

FOREIGN PATENT DOCUMENTS

| JP | H10-287188 A | 10/1998 |
| JP | 10-297319 A | 11/1998 |

(Continued)

OTHER PUBLICATIONS
U.S. Appl. No. 14/235,187, filed Jan. 27, 2014, Sugiyama et al.
(Continued)

*Primary Examiner* — John Q Nguyen
*Assistant Examiner* — Michael Kerrigan
(74) *Attorney, Agent, or Firm* — Posz Law Group, PLC

(57) ABSTRACT

A display control apparatus for controlling a display device including a screen having a plurality of areas so as to assign and display a content on a corresponding area, includes: a content managing unit managing the content by associating content information; an area managing unit managing the area by associating area information; and a content assignment control unit determining a combination of the content and the area. The content assignment control unit generates a content list, generates an area list, extracts a combination list based on the area list and the content list, calculates an evaluation reference value of each combination list based on the content information and the area information, selects the combination list based on the evaluation reference value of each combination list, and determines a combination.

37 Claims, 20 Drawing Sheets

(51) Int. Cl.
*H04N 21/472* (2011.01)
*G06F 5/00* (2006.01)

(56) References Cited

U.S. PATENT DOCUMENTS

| | | | |
|---|---|---|---|
| 7,065,712 | B2 | 6/2006 | Muto et al. |
| 7,136,749 | B2 | 11/2006 | Ichihara et al. |
| 8,548,677 | B2 | 10/2013 | Sugiyama et al. |
| 8,619,092 | B2 | 12/2013 | Yamauchi |
| 2002/0100058 | A1 | 7/2002 | Hirose et al. |
| 2003/0086619 | A1 | 5/2003 | Nagaishi |
| 2005/0179711 | A1 | 8/2005 | Yoshida |
| 2005/0284984 | A1 | 12/2005 | De Lauzun et al. |
| 2007/0113175 | A1 | 5/2007 | Iwasaki |
| 2008/0211654 | A1 | 9/2008 | Kasamatsu |
| 2008/0250027 | A1 | 10/2008 | Hirose et al. |
| 2009/0115592 | A1 | 5/2009 | Miake et al. |
| 2010/0117810 | A1 | 5/2010 | Hagiwara et al. |
| 2010/0164698 | A1 | 7/2010 | Tsubooka et al. |
| 2010/0245071 | A1 | 9/2010 | Fujisawa et al. |
| 2011/0035145 | A1 | 2/2011 | Yamasaki |
| 2012/0215404 | A1 | 8/2012 | Sugiyama et al. |

FOREIGN PATENT DOCUMENTS

| | | |
|---|---|---|
| JP | H11-282834 A | 10/1999 |
| JP | 11-311545 | 11/1999 |
| JP | 2004-042683 A | 2/2004 |
| JP | 2006-285434 | 10/2006 |
| JP | 2007-145137 A | 6/2007 |
| JP | 2007-299325 A | 11/2007 |
| JP | 2008-301264 A | 12/2008 |
| JP | 2009-223061 A | 10/2009 |
| JP | 2010-15300 | 1/2010 |
| JP | 2011-055343 A | 3/2011 |
| JP | 2011-141699 A | 7/2011 |
| JP | 2011-193040 | 9/2011 |
| JP | 2011-204023 | 10/2011 |
| JP | 2013-137643 | 7/2013 |
| WO | WO2013/061577 | 2/2013 |
| WO | WO2013/061576 | 5/2013 |

OTHER PUBLICATIONS

International Search Report of the International Searching Authority mailed Nov. 13, 2012 for the corresponding international application No. PCT/JP2012/005080 (with English translation).
Written Opinion of the International Searching Authority mailed Nov. 13, 2012 for the corresponding international application No. PCT/JP2012/005080 (with English translation).
Written Reply dated Nov. 13, 2012 for the corresponding international application No. PCT/JP2012/005080 (with English translation).
Written Opinion of the International Preliminary Examination Authority mailed Jun. 25, 2013 for the corresponding international application No. PCT/JP2012/005080 (with English translation).
Office Action mailed on Jan. 27, 2015 in corresponding JP application No. 2012-176322 (with English translation).
Office Action mailed Feb. 24, 2015 issued in corresponding JP patent application No. 2012-271465 (and English translation).
Office Action mailed Mar. 12, 2015 in the related U.S. Appl. No. 14/235,187 (US 2014/0152433).
U.S. Appl. No. 14/353,154, filed Apr. 21, 2014, Ueda et al.
U.S. Appl. No. 14/353,372, filed Apr. 22, 2014, Ueda et al.
Office Action mailed Nov. 12, 2013 in related JP Application No. 2012-187566 (with English translation).
Office Action mailed Dec. 17, 2013 in related JP Application No. 2012-187564 (with English translation).
Office Action mailed Nov. 26, 2013 in related JP Application No. 2012-230960 (with English translation).
International Search Report of the International Searching Authority mailed Nov. 27, 2012 for the related international application No. PCT/JP2012/006775 (with English translation).
Written Opinion of the International Preliminary Examination Authority mailed Nov. 27, 2012 for the related international application No. PCT/JP2012/006775 (with English translation).
International Preliminary Examination Report mailed Sep. 10, 2013 in the related international application No. PCT/JP2012/006775 (with English translation).
International Search Report mailed Nov. 27, 2012 in a related PCT application No. PCT/JP2012/006776 (with English Translation).
Written Opinion mailed Nov. 27, 2012 in a related PCT application No. PCT/JP2012/006776 (with English Translation).
Written Reply in PCT/JP2012/005079 received by the JPO on May 8, 2013 (with English translation).
Amendment in PCT/JP2012/005079 received by the JPO on May 8, 2013 (with English translation).
Office Action mailed May 7, 2014 in the related JP application No. 2012-187564 (with English translation).
U.S. Appl. No. 14/361,737, filed May 30, 2014, Ueda et al.
International Search Report of the International Searching Authority mailed Apr. 9, 2013 in related international application No. PCT/JP2012/008262. (with English translation).
Written Opinion mailed Apr. 9, 2013 in related PCT application No. PCT/JP2012/008262. (with English translation).
Office Action mailed May 12, 2015 issued in corresponding JP patent application No. 2012-271465 (and English translation).
International Search Report and Written Opinion of PCT/JP2012/005079 dated Nov. 13, 2012 (and English translation).
Written Opinion of International Preliminary Examining Authority PCT/JP2012/005079 dated Jun. 25, 2013 (and English translation).
International Preliminary Examination Report of PCT/JP2012/005079 dated Nov. 26, 2013 (and English translation).
Reply of PCT/JP2012/005079.
Amendment of PCT/JP2012/005079.
Office Action mailed Oct. 6, 2015 in the corresponding JP application No. 2012-176322 (with English translation).
Office Action mailed Nov. 20, 2015 in the related U.S. Appl. No. 14/361,737.
Office Action issued by U.S. Patent Office on Nov. 16, 2015 in connection with related U.S. Appl. No. 14/353,372.

(a) VISUAL LINE SUITABILITY TABLE

| | CONTENT | | | | |
|---|---|---|---|---|---|
| AREA | 1 | 2 | 3 | 4 | 5 |
| 1 | 10 | 8 | 6 | 4 | 2 |
| 2 | 10 | 10 | 8 | 6 | 4 |
| 3 | 10 | 10 | 10 | 8 | 6 |
| 4 | 10 | 10 | 10 | 10 | 8 |
| 5 | 10 | 10 | 10 | 10 | 10 |

(b) EXPRESSION POWER SUITABILITY TABLE

| | CONTENT | | | | |
|---|---|---|---|---|---|
| AREA | 1 | 2 | 3 | 4 | 5 |
| 1 | 10 | 8 | 6 | 4 | 2 |
| 2 | 10 | 10 | 8 | 6 | 4 |
| 3 | 10 | 10 | 10 | 8 | 6 |
| 4 | 10 | 10 | 10 | 10 | 8 |
| 5 | 10 | 10 | 10 | 10 | 10 |

(c) OPERATION SUITABILITY TABLE

| | CONTENT | | | | |
|---|---|---|---|---|---|
| AREA | 1 | 2 | 3 | 4 | 5 |
| 1 | 10 | 0 | 0 | 0 | 0 |
| 2 | 10 | 10 | 8 | 6 | 4 |
| 3 | 10 | 10 | 10 | 8 | 6 |
| 4 | 10 | 10 | 10 | 10 | 8 |
| 5 | 10 | 10 | 10 | 10 | 10 |

| AREA LIST |
|---|
| a |
| b , c |
| b , f , g |
| c , d , e |
| d , e , f , g |

(b)

| CONTENT LIST |
|---|
| X , W |
| Z , W |

(c)

| ASSIGNMENT INFORMATION |
|---|
| X − a<br>X − b |
| Z − a<br>Z − c |
| W − b<br>W − d |

(d)

| COMBINATION LIST |
|---|
| X − a |
| Z − a |
| X − b |
| Z − c , W − b |
| ... |

| NAME | INFORMATION VALUE | | SIZE (W×H) |
|---|---|---|---|
| | INITIAL VALUE | CHANGED VALUE | |
| NIGHT VIEW | 130 | — | 400×250 |
| GADGET LARGE | 120 | 0 *DURING DRIVING | 400×250 |
| SPEED (METER) | 110 | — | 700×360 |
| SPEED (HUD) | 100 | | 200×300 |
| LANE/TURN BY TURN | 95 | — | 140×120 |
| TACHOMETER | 90 | — | 162×360 |
| ACC | 85 | — | 235×190 |
| SHIFT POSITION | 70 | — | 100×55 |
| FUEL GAUGE | 65 | — | 162×360 |
| OUTSIDE AIR TEMPERATURE | 60 | — | 100×55 |
| ODOMETER | 55 | — | 160×55 |
| GADGET SMALL | 50 | — | 200×130 |
| MAIL SMALL | 50 | — | 100×60 |
| MAIL LARGE | 50 | — | 300×200 |
| ENERGY FLOW | 35 | — | 235×190 |

(a)

BEFORE SHIFT (130)

(b)

AFTER SHIFT (215=95+85+35)

| PRIORITY HIGH ↑ PRIORITY LOW | NIGHT VIEW | 130 |
|---|---|---|
| | — | — |
| | TACHOMETER | 90 |
| | ACC | 85 |
| | ENERGY FLOW | 35 |

(b)

| PRIORITY HIGH ↑ PRIORITY LOW | NIGHT VIEW | 130 |
|---|---|---|
| | LANE/TURN BY TURN | 95 |
| | TACHOMETER | 90 |
| | ACC | 85 |
| | ENERGY FLOW | 35 |

(a)

(b)

(a)

(b)

DISPLAY CONTROL APPARATUS

CROSS REFERENCE TO RELATED APPLICATION

This present disclosure is a U.S. national stage application of PCT/JP2012/005080 filed on Aug. 9, 2012, and is based on Japanese Patent Application No. 2011-176033 filed on Aug. 11, 2011, Japanese Patent Application No. 2011-196098 filed on Sep. 8, 2011, Japanese Patent Application No. 2011-288063 filed on Dec. 28, 2011, Japanese Patent Application No. 2011-288064 filed on Dec. 28, 2011, Japanese Patent Application No. 2012-164976 filed on Jul. 25, 2012, Japanese Patent Application No. 2012-164977 filed on Jul. 25, 2012, Japanese Patent Application No. 2012-176321 filed on Aug. 8, 2012, and Japanese Patent Application No. 2012-176322 filed on Aug. 8, 2012, the disclosures of which are incorporated herein by reference.

TECHNICAL FIELD

The present disclosure relates to a display control apparatus for displaying vehicle information and the like in a display device prepared in the compartment of a vehicle so that the user can easily grasp the information.

BACKGROUND ART

Information provided in the compartment of a vehicle is various. Examples of the information include vehicle speed, engine rotational speed, shift position, fuel, and water temperature indicative of the state of the vehicle. Other examples include a map for navigation, setting information of an air conditioner, and audio information. In recent years, a night view for driving assistance, information of a portable terminal carried in the vehicle, and the like are also provided.

Various display devices for providing the information such as a head-up display and a liquid crystal display displaying a map for navigation and the like come to be mounted. Some meter panels displaying vehicle speed and the like can provide various information by employing liquid crystal or the like and can be said as a king of display devices.

Since the number of pieces of information (hereinbelow, called "contents") provided is increasing and a plurality of display devices are mounted as described above, it becomes important to determine which content, and which region (hereinbelow, called "area") in which display device.

Conventionally, a technique of assigning a plurality of pieces of screen data generated by a portable terminal to a single display is disclosed (for example, refer to patent literature 1). In the technique, priority is assigned to screen data and display regions, and a region is determined in priority order.

However, a display area displaying a content has to be determined in view of the whole, and a combination made in descending order of priority as described in the patent literature 1 is not always the optimum combination.

For example, it is assumed that, in the case where there are two contents X and Y and two areas "a" and "b", when they are combined in priority order, pairs of "X-a" and "Y-b" are made. Even when the combination "X-a" is a combination of elements having high priority and is optimum, there is fear that the combination "Y-b" becomes inappropriate. Therefore, although the combination "X-b" is not optimum, there is the possibility that the combinations "X-b" and "Y-a" are more appropriate.

PRIOR ART LITERATURES

Patent Literature

[Patent Literature 1]
Japanese Unexamined Patent Application Publication No. 2009-140488

SUMMARY OF INVENTION

It is an object of the present disclosure to provide a display control apparatus capable of combining a content and an area so as to be appropriate in total by evaluating combinations of contents and areas.

In a first aspect of the present disclosure, a display control apparatus controls a display device mounted in a vehicle. The display device includes a screen having a plurality of areas set as display regions. The display control apparatus controls the display device so as to assign a content to a corresponding area and to display the content. The display control apparatus includes: a content managing unit managing the content by associating content information as an attribute of the content with a corresponding content; an area managing unit managing the area by associating area information as an attribute of the area with a corresponding area; and a content assignment control unit determining a combination of the content managed by the content managing unit and the area managed by the area managing unit. The content assignment control unit executes: a content list generating process for generating a content list according to contents managed by the content managing unit; an area list generating process for generating an area list as an available combination of the areas managed by the area managing unit; a combination list extracting process for extracting a combination of the areas and the contents as a combination list based on the area list and the content list; an evaluation reference value calculating process for calculating an evaluation reference value of each combination list based on the content information and the area information; and a combination determining process for selecting the combination list and determining a combination of the contents and the areas based on the evaluation reference value of each combination list.

In the display control apparatus, different from a case of simply assigning a priority according to the conventional technique, one of combination lists is selected from extracted combination lists and a combination of a content and an area is determined. Consequently, a content and an area can be combined so as to be appropriate in total.

According to a second aspect of the present disclosure, a display control apparatus controls a display device mounted in a vehicle. The display device includes a screen having a plurality of areas set as display regions. The display control apparatus controls the display device so as to assign a content as an object to be displayed to at least one corresponding area. The display control apparatus includes: a content managing unit managing a content parameter associated with each content, each content parameter including at least a content evaluation value expressing a priority of display of the content or a content size expressing a size of display data; an assignment control unit generating a plurality of combination lists provided by the plurality of contents and the plurality of display areas; and an evaluation value obtaining unit obtaining a combination evaluation value corresponding to each combination list based on the content parameters. The assignment control unit selects one of the combination lists by comparing the combination evaluation value of each combination list.

In the display control apparatus, different from a case of simply assigning a priority according to the conventional technique, one of combination lists is selected from extracted combination lists and a combination of a content and an area is determined. Consequently, a content and an area can be combined so as to be appropriate in total.

BRIEF DESCRIPTION OF DRAWINGS

The above and other objects, features and advantages of the present disclosure will become more apparent from the following detailed description made with reference to the accompanying drawings. In the drawings:

FIG. 4(a) is a diagram illustrating a line-of-sight suitability table, FIG. 4(b) is a diagram illustrating an expression power suitability table, and FIG. 4(c) is a diagram illustrating an operation suitability table;

FIG. 10(a) is a diagram illustrating an area list, FIG. 10(b) is a diagram illustrating a content list, FIG. 10(c) is a diagram illustrating assignment information, and FIG. 10(d) is a diagram illustrating a combination list;

FIG. 17 is a diagram illustrating content assigned to areas in the meter panel and the head-up display;

FIGS. 19(a) and 19(b) are diagrams illustrating priority of content;

EMBODIMENTS FOR CARRYING OUT INVENTION

Hereinafter, embodiments of the disclosure will be described with reference to the drawings.

Figure 1:
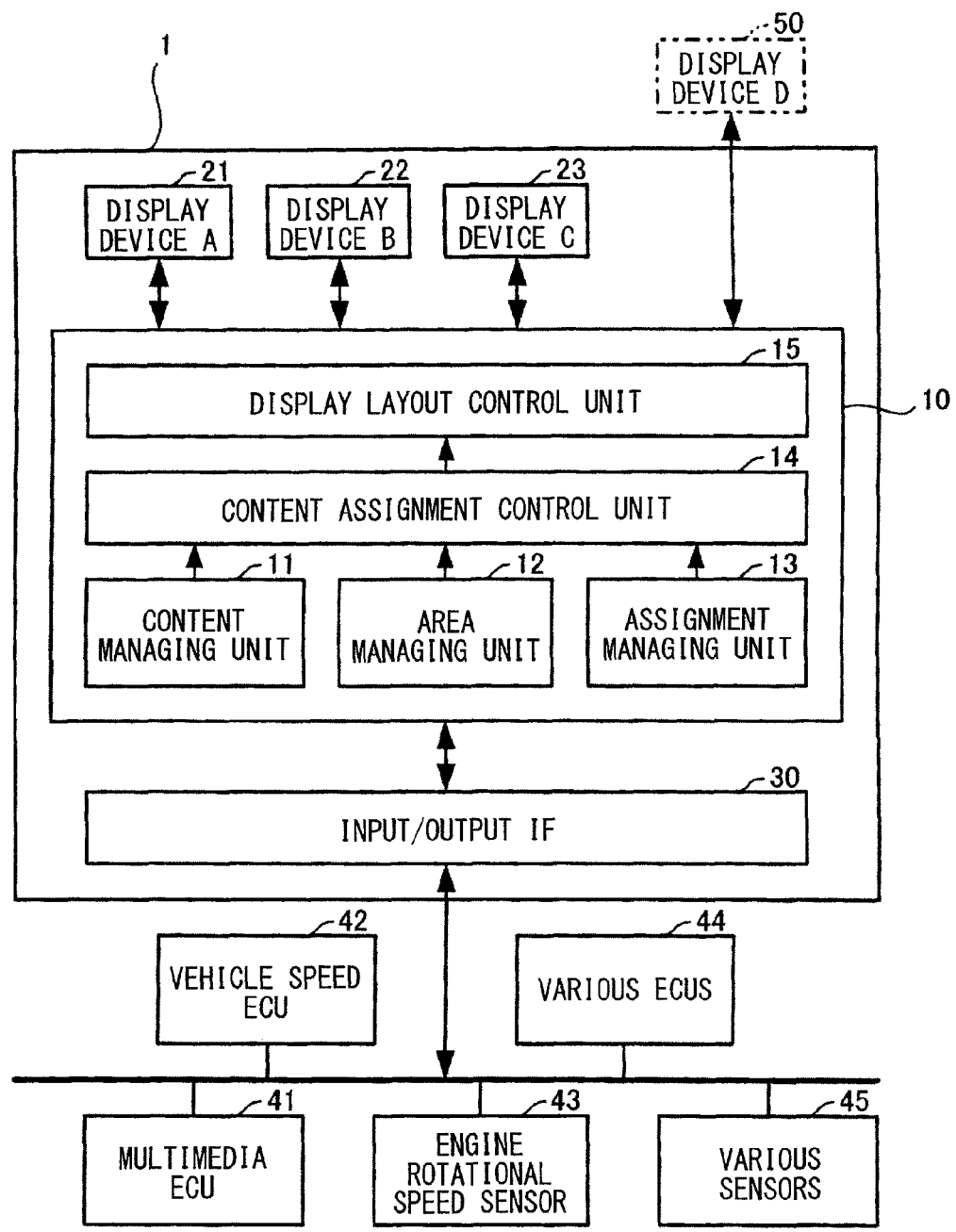
FIG. 1 is a block diagram illustrating a schematic configuration of a display control apparatus.

FIG. 1 is a block diagram illustrating a schematic configuration of a display control apparatus 1 of an embodiment.

The display control apparatus 1 is constructed mainly by a control unit 10. To the control unit 10, three display devices 21, 22, and 23 and an input/output IF 30 are connected. To distinguish the three display devices 21, 22, and 23, they will be described as "A display device 21", "B display device 22", and "C display device 23" as necessary.

The three A, B, and C display devices 21, 22, and 23 are embodied as, for example, a head-up display, a meter panel, and a color liquid crystal display device for displaying a map and the like for navigation, respectively. However, they are not limited to the examples.

The input/output IF 30 has a configuration for connection to a network in the vehicle (for example, CAN). Via the input/output IF 30, the display control apparatus 1 is connected to a multimedia ECU 41, a vehicle-speed ECU 42, an engine rotational speed sensor 43, various ECUs 44, and various sensors 45. The various ECUs 44 include, for example, a navigation ECU. The various sensors 45 include an ambient temperature sensor for detecting the temperature on the outside of the vehicle compartment and a water-temperature sensor for detecting the temperature of engine cooling water.

With such a configuration, the display control apparatus 1 can obtain various contents via a network. The contents include "audio information" obtained from the multimedia ECU 41, "vehicle speed" obtained from the vehicle-speed ECU 42, "engine rotational speed" obtained from the engine rotational speed sensor 43, "map" obtained from the navigation ECU included in the various ECUs 44, and "ambient temperature" obtained from the ambient temperature sensor included in the various sensors 45.

The control unit 10 has a content managing unit 11, an area managing unit 12, an assignment managing unit 13, a content assignment control unit 14, and a display layout control unit 15.

Figure 2:
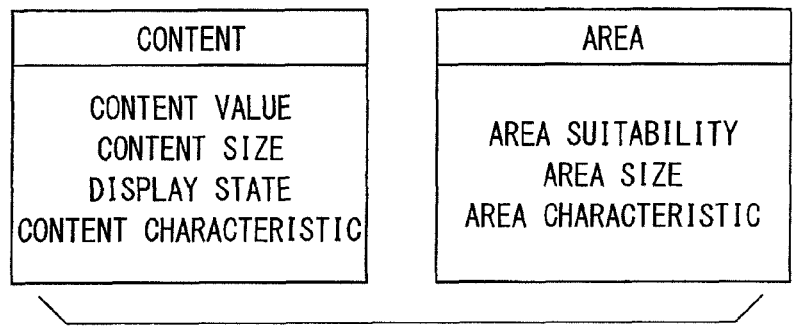
FIG. 2 is a diagram illustrating attributes associated with a content and an area.

The content managing unit 11 has the function for managing the above-described contents and manages also contents in different categories. The content managing unit 11 has, as illustrated in FIG. 2, a storing device storing four attributes (parameters) of "content value", "content size", "display state", and "content characteristic" so as to be associated with a content.

The content value in the embodiment indicates the value of a content for each display target person, that is, how useful the content is for a specific display target person in comparison to the other contents. In the embodiment, display target persons are a driver, an assistant-driver-seat passenger, and a rear-seat passenger. That is, the value of a content various among the display target persons. For example, contents such as "vehicle speed" and "engine rotational speed" are information which is valuable (useful) to the driver. Consequently, each content has three values of a content value (driver), a content value (assistant-driver-seat passenger), and a content value (rear-seat passenger). In the embodiment, it is assumed that the content value is stored as a numerical value of "0" or larger. Although the display target persons are a driver, an assistant-driver-seat passenger, and a rear-seat passenger in the embodiment, further, rear-seat passengers may be discriminated as a left-side rear-seat passenger and a right-side rear-seat passenger or the content value may be set only for the driver as the display target person.

The content size is the size of an area required to display the content and is expressed by, for example, the numbers of pixels in the vertical and horizontal directions.

Further, the display state is flag information indicating whether the content is a display target or not. Either an "active state" indicating that the content is a display target or an "inactive state" indicating that the content is not a display target is set.

Concretely, each content is switched between the "active state" and the "inactive state" in accordance with a vehicle state and a user operation. For example, when a shift range is R, a content of a "back monitor" based on information captured by a rear view camera is an "active state". When the shift range is not R, the content of the "back monitor" is an "inactive state". For example, when the user turns on an audio switch, the content of "audio information" of an audio control panel or the like becomes the "active state". When the user turns off the audio switch, the content of "audio information" becomes the "inactive state".

The content characteristic is a characteristic the display area is required by the user to use the content. In the embodiment, the three content characteristics such as the visual-line characteristic, the expression power characteristic, and the operation characteristic are associated with each content.

The visual-line characteristic is set as an index expressing whether or not a content has to be disposed in a display area to which the driver does not have to move his/her visual line and which is easily seen by the driver, and is indicated in five levels "1" to "5". The characteristic value increases as the degree that a content which does not permit the visual-line operation becomes higher. A content which does not permit the visual-line operation is a content the user has to frequently recognize and is, for example, "vehicle speed". The visual-line characteristic is a characteristic to drivers.

The expression power characteristic is set as an index expressing the degree of requiring the expression power (resolution, color, and the like) of the display area at the time of displaying a content in five levels "1" to "5". The value increases as the degree that a content requires the expression power becomes higher. A content which requires the expression power is a content having a large amount of information and is, for example, a "map" for navigation.

The operation characteristic is set as an index expressing the degree of necessity of an operation on a content in five levels "1" to "5". The value increases as the degree of necessity of an operation for a content becomes higher. A content for which an operation is necessary is, for example, an "audio control panel" for a reason that an operation for, for example, selecting a music piece to be reproduced is necessary.

Although each of the characteristics is expressed in the five levels "1" to "5" in the embodiment, the invention is not limited to the five levels. It is sufficient to express the characteristics in at least two levels.

Referring again to FIG. 1, the area managing unit 12 has the function for managing a plurality of areas as display regions. Areas in the embodiment are set in the screen of the three display devices A 21 to C 23. The area managing unit 12 similarly manages the areas in the three display devices A 21 to C 23. That is, it manages the area in the display device A 21 and the area in the display device B 22 without distinction. The area managing unit 12 of the embodiment has a storing device for storing data so as to be associated with, as illustrated in FIG. 2, the three attributes (parameters) of "area suitability", "area size", and "area characteristic" for each of the areas.

The area suitability is an index expressing visibility of the area by the display target persons. As described above, the display target persons are a driver, an assistant-driver-seat passenger, and a rear-seat passenger. That is, the area suitability varies among the display target persons. For example, the area of the meter panel has high area suitability for the driver. For example, the area of a liquid crystal display device for displaying a map for navigation or the like has high area suitability for the driver and the assistant-driver-seat passenger. Consequently, each area has, although not limited, three values of suitability; area suitability (driver), area suitability (assistant-driver-seat passenger), and area suitability (rear-seat passenger). In the embodiment, the area suitability will be indicated, although not limited, in ten levels "1" to "10".

The area size is the size of an area and is expressed by, for example, the number of pixels in the vertical and horizontal directions in a manner similar to the content size.

Further, the area characteristic is also a characteristic of an area corresponding to the content characteristics. In the embodiment, three characteristics of the visual-line characteristic, the expression power characteristic, and the operation characteristic are associated with each area.

The visual-line characteristic indicates whether a display target person has to move his/her visual line in five levels "1" to "5". The characteristic value increases as the degree that a content which does not permit the visual-line operation becomes higher. A content which does not permit the visual-line operation is a content the user has to frequently recognize and is, for example, "vehicle speed". The visual-line characteristic is a characteristic to drivers.

The expression power characteristic expresses whether the expression power (resolution, color, and the like) of an area is high or not in five levels "1" to "5". The higher the expression power of an area is, the larger the value is. An area having high expression power is, for example, the area of a liquid crystal display device displaying a "map" for navigation and the like.

The operation characteristic expresses whether the operability of the area is high or not in five levels "1" to "5". The higher the operability of the area is, the larger the value is. An area in which a complicated operation can be performed is, for example, the area of a liquid crystal display device integrated with a touch panel.

Although the area characteristic is expressed in the five levels "1" to "5" in the embodiment, the invention is not limited to the five levels. It is sufficient to express the characteristics in at least two levels.

Figure 3:
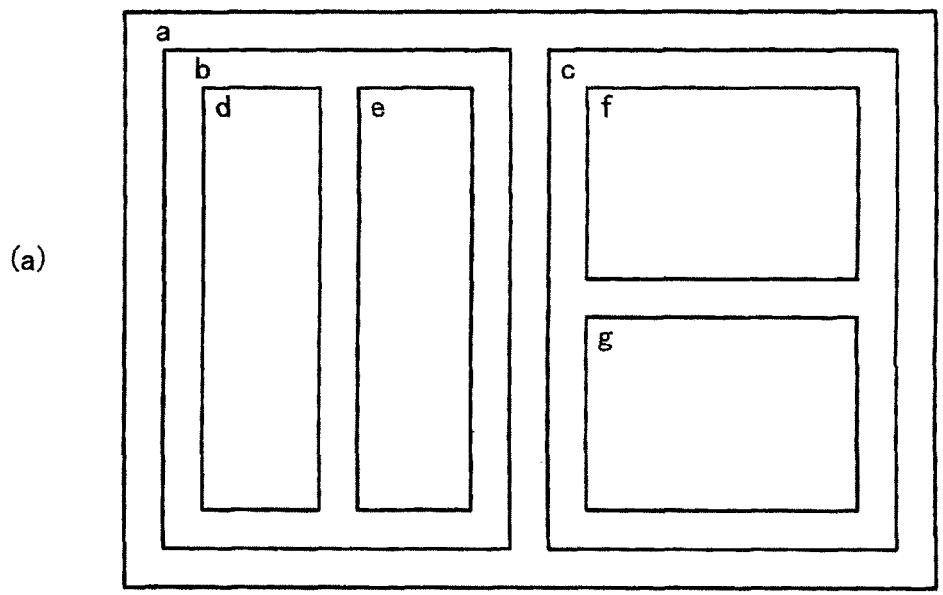
FIGS. 3(a) and 3(b) are diagrams illustrating a hierarchical data structure in an area managing unit.
Figure 3:
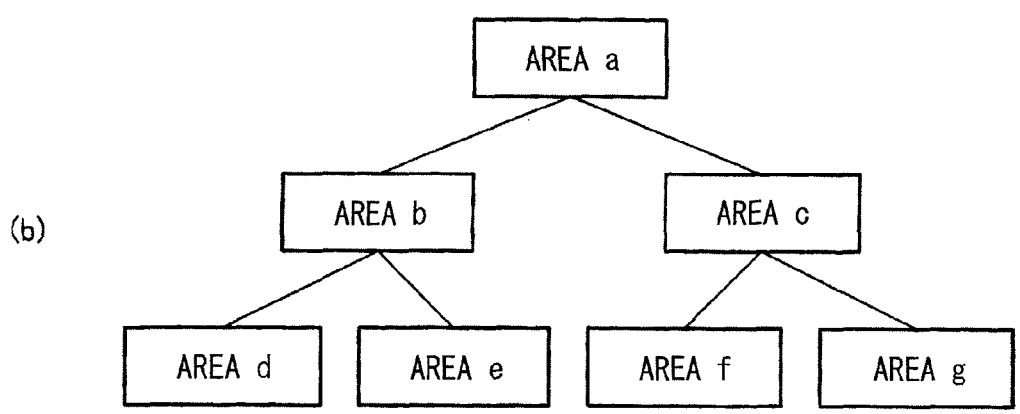

The area managing unit 12 manages a plurality of areas which are set in the display devices A to C 21 to 23 by a hierarchical data structure. In other words, to use the display screen of each of the display devices 21 to 23 as a single area or a plurality of divided display areas, the area managing unit 12 has a storing device storing variables indicating hierarchical structure relations of the areas. For example, the area of the A display device 21 will be described. As illustrated in FIGS. 3(a) and 3(b), the display screen of the A display device 21 can provide display areas a to g, and the storing device stores the inclusive relations of the areas. The inclusive relations of the areas are referred to at the time of extracting a combination of a content and an area, and areas included in areas already occupied are excluded from areas to which a content is assigned.

It is assumed that the display regions of the A display device 21 are set as areas "d" and "e" obtained by dividing an area "b" into halves, and areas "f" and "g" obtained by dividing an area C into upper and lower parts.

As illustrated in FIG. 3(b), the area "a" is managed as the area in the highest hierarchy. The areas "b" and "c" are managed in the level just below the area "a", the areas "d" and "e" are managed in the level just below the area "b", and the areas "f" and "g" are managed in the level just below the area "c".

Referring again to FIG. 1, the assignment managing unit 13 stores suitability tables for calculating the suitability based on the content characteristics and the area characteristics, an essential exclusion constraint equation which will be described later, and assignment information of a specific content for a specific area.

The suitability tables include a visual-line suitability table (refer to FIG. 4(a)) for calculating visual-line suitability on the basis of the visual characteristics of a content and an area, an expression power suitability table (refer to FIG. 4(b)) for calculating expression power suitability for calculating expression power suitability on the basis of the expression power characteristics of a content and an area, and an operation suitability table (refer to FIG. 4(c)) for calculating operation suitability on the basis of the operation suitability on the basis of the operation characteristics of a content and an area.

The suitability is expressed in ten levels "1" to "10" in the suitability tables. The higher the suitability is, the larger the value is. Like the area suitability, the invention is not limited to the expression in the ten levels.

From the suitability tables, the suitability by the characteristics is calculated from the content characteristic of each content and the area characteristics of each area. For example, it is assumed that a "map" for navigation having a large amount of information is a content requiring the expression power, so that its expression power characteristic is "5", and the expression power characteristic of the area of the liquid crystal display device having high expression power is "5". In this case, in the example of FIG. 4(b), the expression power suitability is calculated as the maximum value "10". It denotes that the expression power suitability at the time of combining the content "map" and the area of the liquid crystal display device is the maximum.

For example, in the case of disposing a content having a small amount of information, requiring no expression power, and having the expression power characteristic "1" to the area of the expression power characteristic "5" of the high expression power, the performance is excessive. Combinations of such excessive performance appear in the part lower than the diagonal line from upper left of each suitability table to lower right. In the embodiment, as will be described later, total of evaluation values in a combination of a content and an area is calculated to extract the optimum combination of the content and the area. Therefore, even when the performance is excessive, the maximum value "10" is assigned.

Concretely, it is assumed that the combination of a content X (expression power characteristic "5") and an area "a" (expression power characteristic "5") and the combination of a content Y (expression power characteristic "1") and an area "b" (expression power characteristic "1") are optimum. In this case, the expression power suitability is "10" in both of the combinations in FIG. 4(b), and the total value is "20".

On the other hand, considering the combination of a content Y (expression power characteristic "1") and an area "a" (expression power characteristic "5") and the combination of a content X (expression power characteristic "5") and an area "b" (expression power characteristic "1"), in the former combination, the performance is excessive, and the expression power suitability is "10". In the latter combination, the expression power suitability is "2" (refer to FIG. 4(b)), and the total value is "12".

That is, in the embodiment, since the total of the evaluation values is calculated in all of the combinations of the contents and the areas, even when the maximum value "10" is assigned to the part where the performance is excessive, the object can be achieved without any problem.

The essential exclusion constraint equation is a constraint equation which is preliminarily determined so that, for example, a necessary content is properly assigned to an area, and overlapping contents are not redundantly displayed in a plurality of areas.

Figure 5:
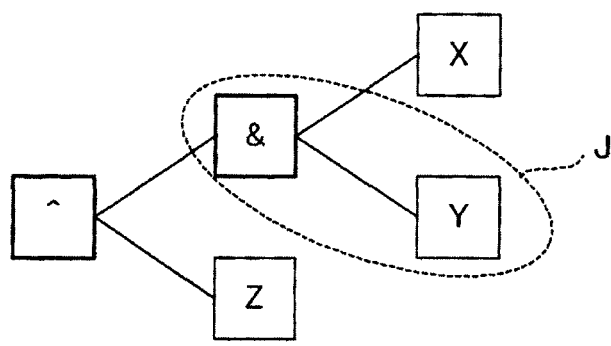
FIGS. 5(a) to 5(d) are diagrams illustrating processes of an essential exclusive constraint equation specified by using a predetermined operator.
Figure 5:
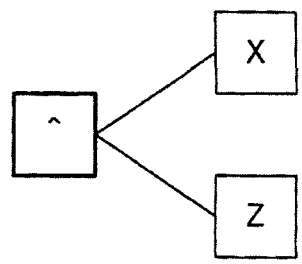
Figure 5:
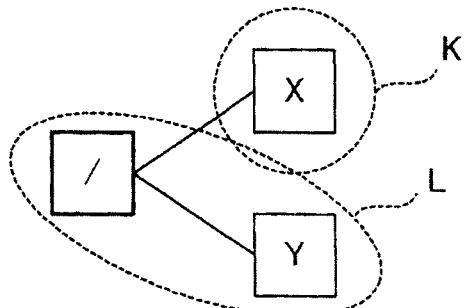

The essential exclusive constraint equation in the embodiment is defined by five operators "&", "|", "^", "/", and "+". The meaning of each of the operators is as shown in FIG. 5(a). That is, in the case where both X and Y are active contents, X&Y denotes that both X and Y are displayed surely.

X|Y denotes that at least one of X and Y is displayed.

X^Y denotes that either X or Y is displayed.

X/Y denotes that either X or Y is displayed or both X and Y are not displayed.

X+Y denotes that both X and Y are displayed or both X and Y are not displayed.

X/Y is expressed as "!(X&Y)" when an operator "!" having the meaning opposite to X&Y, that is, indicating negation, and X+Y is described as "!(X^Y)" having the meaning opposite to X^Y. In the embodiment, a process for an operator is performed in a display control process which will be described later. To simplify the process, use of the operator "!" indicative of negation is avoided.

Further, assignment information of a specific content for a specific area indicates the correspondence relation between a predetermined specific area and a predetermined specific content. That is, in the embodiment, assignment of a content and an area is performed. By referring to the assignment information, a part of contents is assigned to a preliminarily designated area. The assignment information is as shown in FIG. 10(c). The upper box in FIG. 10(c) shows that the content X is assigned to the area "a" or "b". The middle box indicates that the content Z is assigned to the area "a" or "c". The lower box indicates that the content W is assigned to the area "b" or "d". FIGS. 10(a) to 10(e) will be described later.

In the embodiment, on the basis of the information stored in the content managing unit 11, the area managing unit 12, and the assignment managing unit 13, the content assignment control unit 14 calculates evaluation values on all of combinations of contents and areas and stores the combinations of the contents and areas. The display layout control unit 15 displays a content on the basis of the combinations of the contents and the areas stored in the content assignment control unit 14.

Figure 6:
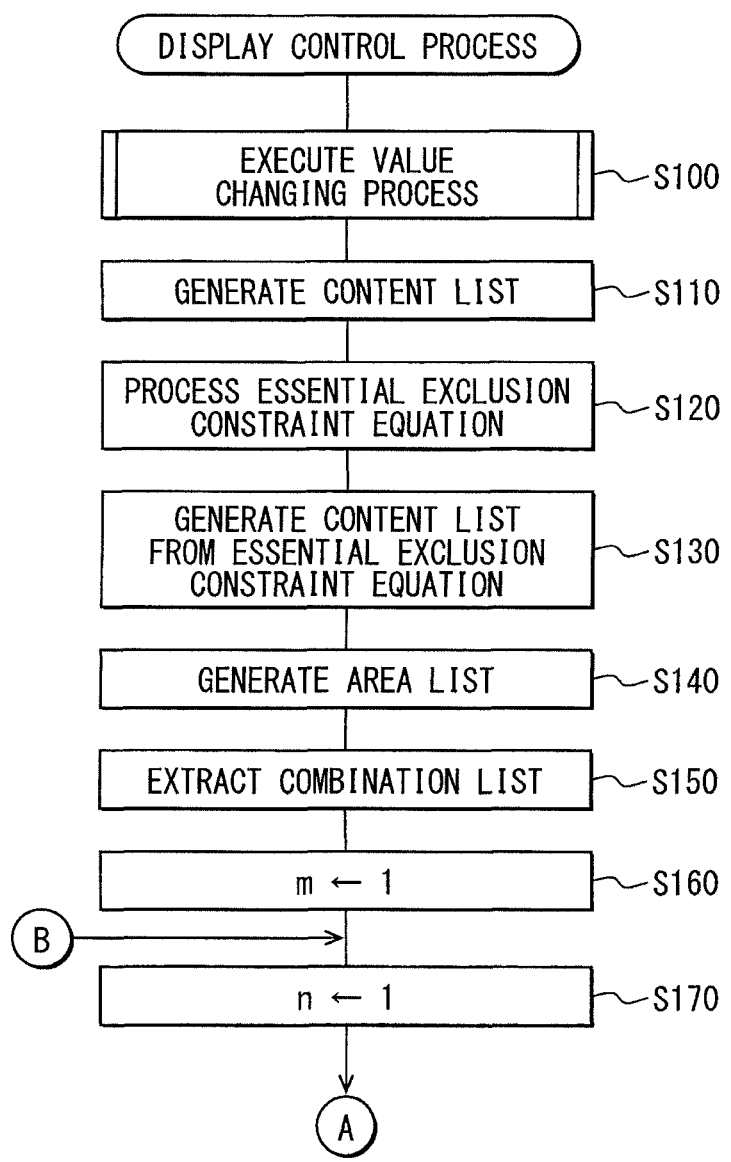
FIG. 6 is a flowchart illustrating the first-half part of a display control process.
Figure 7:
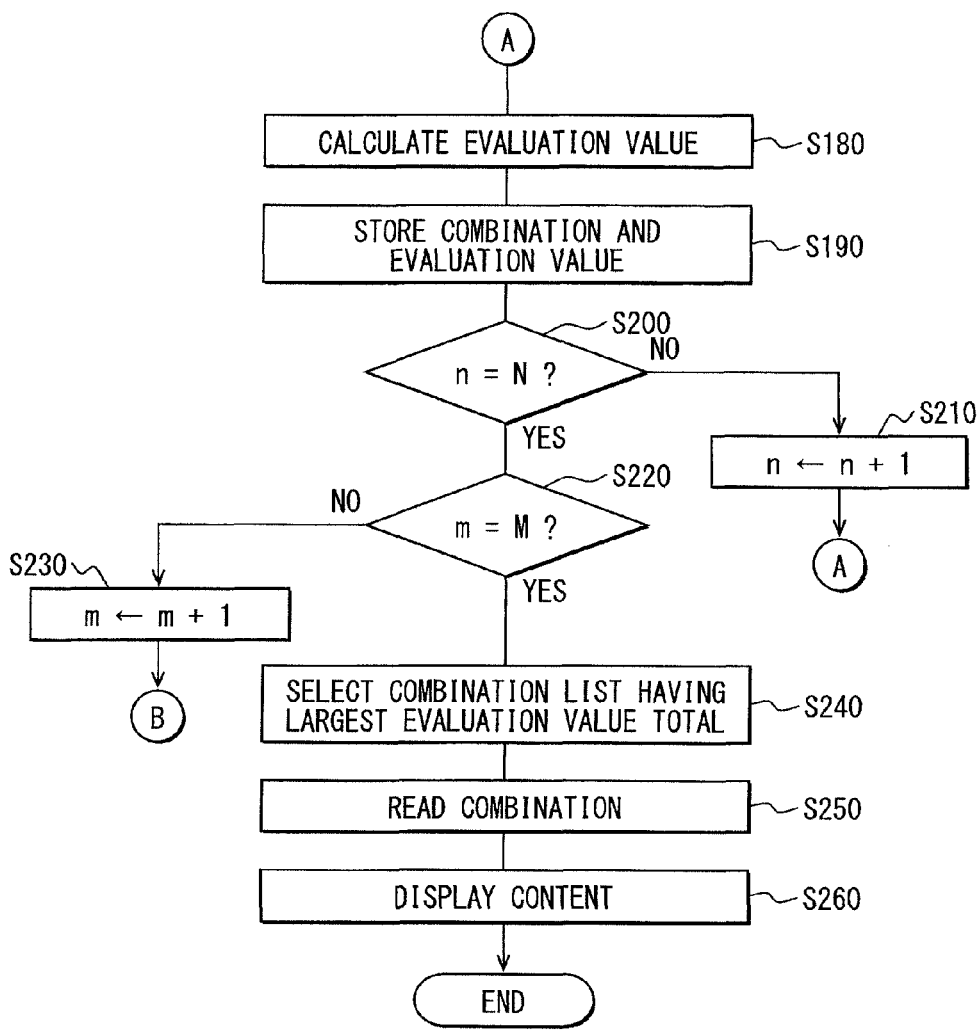
FIG. 7 is a flowchart illustrating the latter half part of the display control process.

Next, the display control process will be described. FIG. 6 is a flowchart illustrating the first-half part of a display control process, and FIG. 7 is a flowchart illustrating the latter half part of the display control process. In the following, the content value and the area suitability will be collectively called "values", and the content size and the area size will be collectively called "sizes".

In first S100, a value changing process is executed. In the process, on the basis of the state of a vehicle (in the embodiment, a driving state indicating whether the vehicle is driving or is stopped), the content value of a content and the area suitability of an area are changed.

Although the value changing process is executed in the embodiment, the process is not essential. Consequently, in another mode, the value changing process may be omitted. Another configuration that the process is executed only when a predetermined condition is satisfied may be employed.

In the following step S110, a content list is generated. The process is performed by extracting contents whose display state as an attribute of a content is "active state" and rearranging the extracted contents. For example, when there are contents X, Y, Z, and W, and contents which are in the "active state" are "X, Z, and W", a content list of "X, Z, and W" is generated.

In the following step S120, the essential exclusion constraint equation is processed. The essential exclusion constraint equation cannot be applied as it is to the contents in the content list because the content whose display state is the "inactive state" is also included in the essential exclusion constraint equation. In the embodiment, therefore, a process of changing the essential exclusion constraint equation including the content which is in the "inactive state" to an equivalent and simpler essential exclusion constraint equation is performed preliminarily.

Concretely, as illustrated in FIG. 5(b), a syntax tree is generated from the essential exclusion constraint equation. In FIG. 5(b), the essential exclusion constraint equation of "(X&Y)^Z" is expressed as a syntax tree. It is assumed here that the contents X and Z are in the "active state", and the content Y is in the "inactive state". In this case, the content Y is deleted from the syntax tree and the operator "&" layered higher than Y is also deleted from the syntax tree (refer to reference character J). As a result, the syntax tree as illustrated in FIG. 5(c) is obtained, and the indispensable exclusion constraint expression becomes "X^Z". The method of deleting a content in the "inactive state" and the operator layered higher than the content is applied to the case where the higher layered operator is "&", "|", or "^".

On the other hand, in the case where the higher layered operator is "/", as illustrated in FIG. 5(d), the content Y in the "inactive state" and the operator "/" layered higher than the content are deleted (refer to reference character L), and the content X layered lower than the deleted operator "|" is also deleted (refer to reference character K). A similar process is performed also in the case where the operator is "+".

In the case of performing such a process of the essential exclusion constraint equation, if an operator indicating negation is used, an expected result cannot be obtained. In the embodiment, therefore, an operator indicating negation is not used.

In the following S130, a content list based on the essential exclusion constraint expression which is simplified in the above-described step is generated. For example, it is assumed that there is an essential exclusion constraint expression "X^Z" as illustrated in FIG. 5(c). When the content list generated in S110 is made of "X, Z, and W", the constraint condition that "either X or Z is displayed" is given to X and Z in the content list. Consequently, two content lists of "X and W" and "Z and W" are generated as new lists (refer to FIG. 10(b)). In this case, either X or Y has to be displayed. For the contents X and Z requested to be essentially displayed on the basis of the essential exclusion constraint equation, to be discriminated from the other contents included in the content list, a flag indicative of essential display is set.

Figure 8:
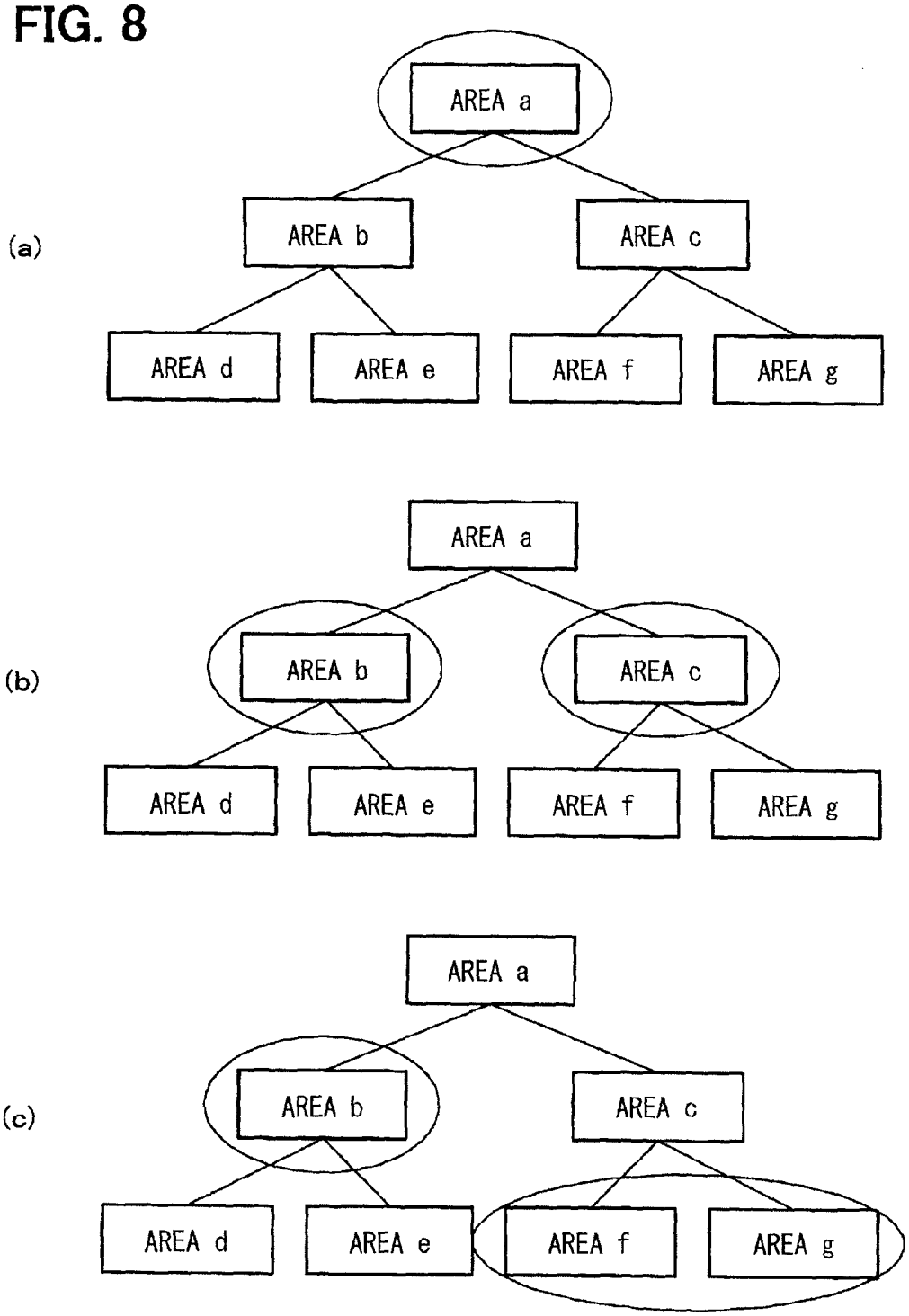
FIGS. 8(a) to 8(c) are diagrams concretely illustrating generation of an area list.
Figure 9:
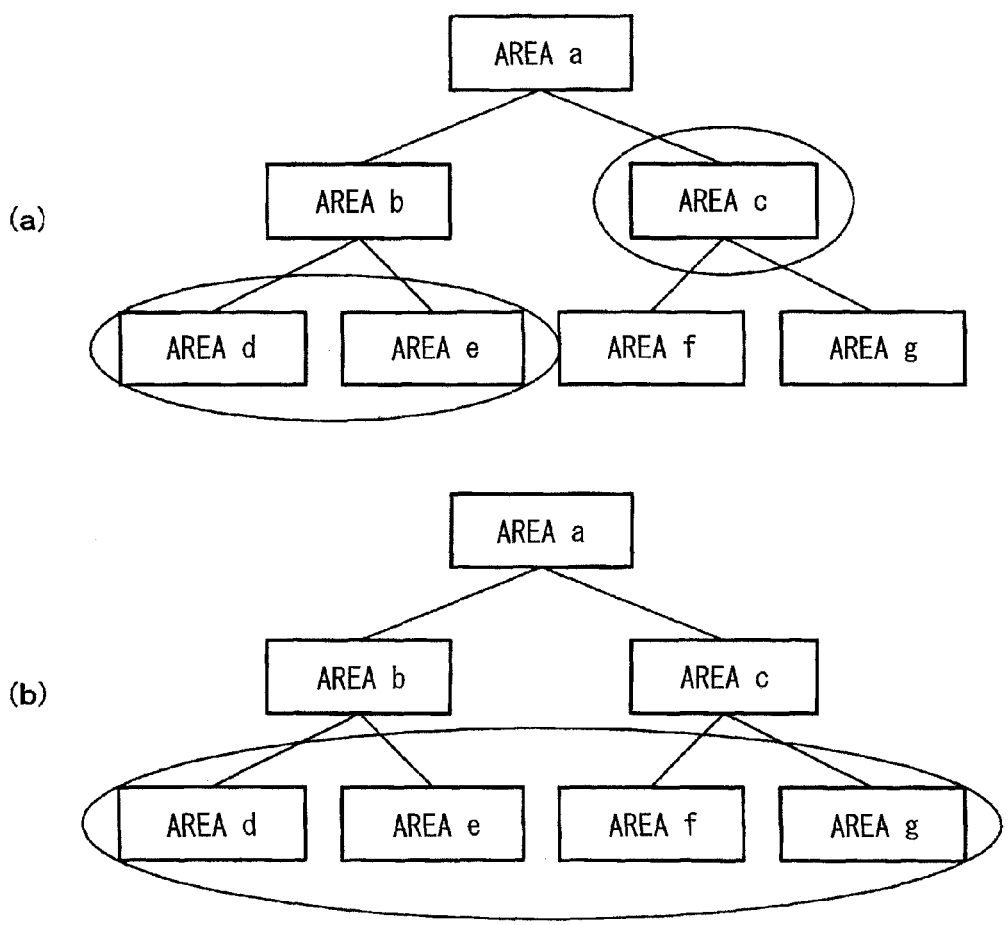
FIGS. 9(a) and 9(b) are diagrams concretely illustrating generation of an area list.

In the following S140, an area list is generated. An area list is a combination of usable areas. As described above, the area managing unit 12 stores the areas of the display devices A to C 21 to 23 in the hierarchical structure. On the basis of such a hierarchical data structure, the combination of usable areas is generated as an area list. For example, in the case where there is a hierarchical data structure as illustrated in FIG. 3(b), the area "a" is extracted as one area list as illustrated in FIG. 8(a). In the case where the area "a" is used, the other areas "b" to "g" cannot be used. As illustrated in FIG. 8(b), the two areas "b" and "c" are extracted as one area list. Similarly, the three areas "b", "f", and "g" are extracted as an area list as illustrated in FIG. 8(c), the three areas "c", "d", and "e" are extracted as an area list as illustrated in FIG. 9(a), and the four areas "d", "e", "f", and "g" are extracted as an area list as illustrated in FIG. 9(b). That is, in the case based on the hierarchical data as illustrated in FIG. 3(b), the five area lists "a", "b, c", "b, f, g", "c, d, e", and "d, e, f, g" are extracted (refer to FIG. 10(a)).

In the following S150, a combination list is extracted. In this process, a combination of a content and an area is extracted as a combination list. As described above, by the process of S130, a content list satisfying the essential constraint equation is generated (refer to FIG. 10(b)). By the process of S140, an area list is generated (refer to FIG. 10(a)). The area lists and the content lists are extracted one by one, and a combination list is extracted on the basis of the assignment information, the size, and a flag indicating whether a content requires essential display or not.

First, the area list "area a" in FIG. 10(a) is extracted, and the content list "X, W" in FIG. 10(b) is extracted. At this time, the assignment information illustrated in FIG. 10(c) indicates assignment of the content X to the area "a" or "b". Therefore, the combination "X-a" is realized. Although the content list is made of "X, W", since only the area "a" exists in the area list, the combination is "X-a". Since the content X which is requested to be essentially displayed is included, the combination list is "X-a" (refer to FIG. 10(d)).

Next, the area list "area a" in FIG. 10(a) is extracted, and the content list "Z, W" in FIG. 10(b) is extracted. The assignment information illustrated in FIG. 10(c) indicates that the content Z is assigned to the area "a" or "c". Therefore, the combination "Z-a" is realized. Although the content list is made of "Z, W", since only the area "a" exists in the area list, the combination is "Z-a". Since the content Z which is requested to be essentially displayed is included, the second combination list is "Z-a" (refer to FIG. 10(d)).

Next, the area list "areas b and c" in FIG. 10(a) is extracted, and the content list "X, W" in FIG. 10(b) is extracted. The assignment information illustrated in FIG. 10(c) indicates that the content X is assigned to the area "a" or "b". Therefore, the combination "X-b" is realized. Subsequently, the content W is extracted from the content list, and a combination with the area "c" is considered. At this time, the assignment information indicates that the content W is assigned to the area "b" or "d". Therefore, the combination "W-c" is not realized, and the combination "X-b" is obtained. Since the content X which is requested to be essentially displayed is included, the third combination list is "X-b" (refer to FIG. 10(d)).

Next, the area list "areas b and c" in FIG. 10(a) is extracted, and the content list "Z, W" in FIG. 10(b) is extracted. The assignment information illustrated in FIG. 10(c) indicates that the content Z is assigned to the area "a" or "c". Therefore, the combination "X-c" is realized. Subsequently, the content W is extracted from the content list, and a combination with the area "b" is considered. At this time, the assignment information indicates that the content W is assigned to the area "b" or "d". Therefore, the combination "W-b" is realized. That is, the combination "Z-c, W-b" is obtained. Since the content Z which is requested to be essentially displayed is included, the fourth combination list is "Z-c, W-b" (refer to FIG. 10(d)).

Similarly, the area lists are extracted one by one, and an area list which is effectively combined with each content list is extracted. At this time, the assignment information is used, and a combination of a content and an area which is not in the assignment information is excluded. There is an area which cannot be assigned from the viewpoint of size in relation between the content size and the area size, and such a combination is also excluded.

By the process of S150 as described above, a plurality of combination lists as illustrated in FIG. 10(d) are generated. Description will be continued on assumption that M pieces of combination lists are generated.

In the following S160, a variable "m" indicative of a combination list is initialized as "1". Each time the variable "m" is incremented, the combination list is processed in order like the first combination list, the second combination list, the third combination list, ...

In the following S170, a variable "n" indicative of a combination is initialized as "1". Each time the variable "n" is incremented, the combination is processed in order like the first combination in the m-th combination list, the second combination in the m-th combination list, the third combination in the m-th combination list, ...

In S180 in FIG. 7, an evaluation value is calculated. In this process, an evaluation value on the n-th combination in the m-th combination list is calculated.

Concretely, in the embodiment, the evaluation value is calculated by an object evaluation value and a characteristic evaluation value.

The object evaluation values include a driver evaluation value (DE), an assistant-driver-seat passenger evaluation value (AE), and a rear-seat passenger evaluation value (RE). The characteristic evaluation values include a driver characteristic evaluation value (DCE), an assistant-driver-seat passenger characteristic evaluation value (ACE), and a rear-seat passenger characteristic evaluation value (RCE). To prevent equations from being complicated, the driver is expressed as "D", the assistant-driver-seat passenger is expressed as "A", and the rear-seat passenger is expressed as "R". In the embodiment, the following equations are obtained.

$$DE = K[D] \times \text{content value}[D] \times \text{area suitability}[D]$$

$$AE = K[A] \times \text{content value}[A] \times \text{area suitability}[A]$$

$$RE = K[R] \times \text{content value}[R] \times \text{area suitability}[R]$$

$$DCE = (K1 \times \text{visual-line suitability} + K2 \times \text{expression power suitability} + K3 \times \text{operation suitability}) \div (K1 + K2 + K3)$$

$$ACE = (K4 \times \text{expression power suitability} + K5 \times \text{operation suitability}) \div (K4 + K5)$$

$$RCE = (K6 \times \text{expression power suitability} + K7 \times \text{operation suitability}) \div (K6 + K7)$$

K[D], K[A], and K[R] indicate the existence of a driver, an assistant-driver-seat passenger, and a rear-seat passenger, become "1" when a driver/passenger gets into a car, and are "0" when there is no driver/passenger in a car. K1 to K7 denote weighting coefficients.

Since the visual-line suitability is the characteristic of only the driver, it is not used for calculation of ACE and RCE.

An evaluation value to be derived is as follows.

$$\text{Evaluation value} = DE \times DCE + AE \times ACE + RE \times RCE$$

In S190, a combination of the content and the area of which evaluation values are obtained in S180, and an evaluation value of the combination are stored.

In the following S200, whether the variable "n" is equal to the number N of combinations or not is determined. The process is performed to determine whether all of combinations included in the m-th combination list are processed or not. In the case where n=N (YES in S200), the routine shifts to S220. On the other hand, in the case where n # N (NO in S200), that is, as long as there is a combination which is not processed, the variable "n" is incremented in S210, and the processes from S180 are repeated.

In S220, whether the variable "m" is equal to the number M of combinations or not is determined. The process is performed to determine whether all of combination lists are processed or not. In the case where m=M (YES in S220), the routine shifts to S240. On the other hand, in the case where m≠M (NO in S220), that is, as long as there is a combination list which is not processed, the variable "m" is incremented in S230, and the processes from S170 in FIG. 6 are repeated.

In S240, based on the total of evaluation values in combination lists, a combination list having the largest total of evaluation values is selected.

In the following S250, a combination of a content and an area in the combination list selected in S240 is read.

The processes from S110 to S250 are realized as the functions of the content assignment control unit 14.

In S260, the content is displayed. The process is performed to display the content in the combination of the content and the area read in S250 in the area, and is realized as the function of the display layout control unit 15.

Figure 11:
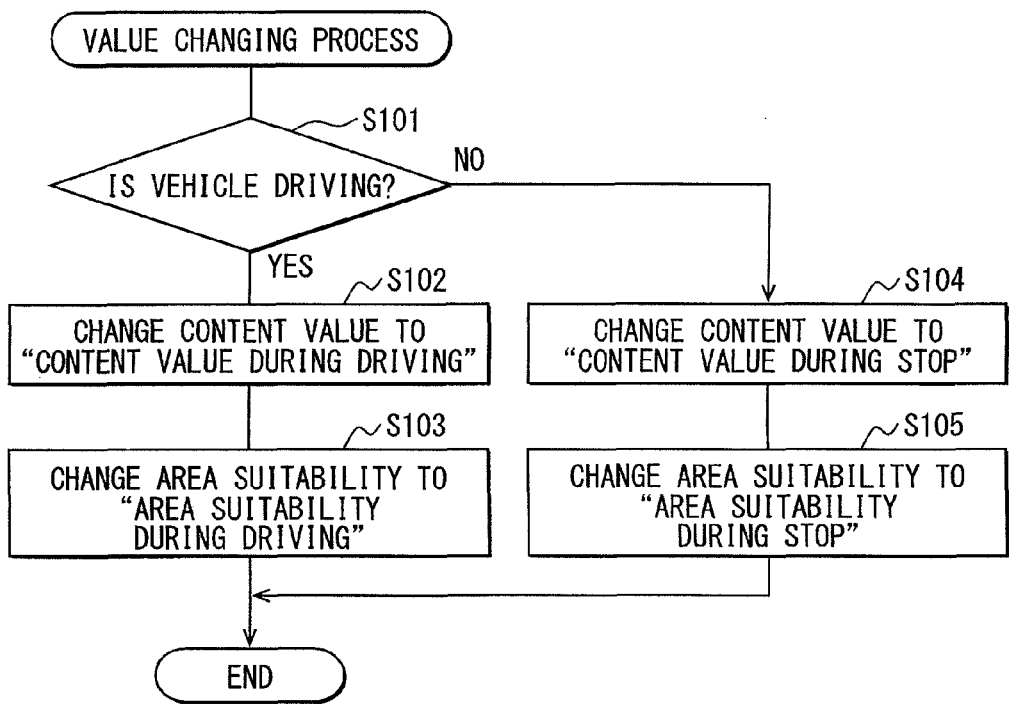
FIG. 11 is a flowchart illustrating a value changing process.

Next, the value changing process in S100 in FIG. 6 will be described. FIG. 11 is a flowchart illustrating the value changing process.

In the first S101, whether a vehicle is driving or not is determined. The determination is made, for example, on the basis of "vehicle speed" transmitted from the vehicle-speed ECU 42. When it is determined that the vehicle is driving (YES in S101), the content value of the content is changed to a content value during driving in S102, the area suitability of the area is changed to area suitability during driving in S103 and, after that, the value changing process is finished. On the other hand, when it is determined that the vehicle is not driving (NO in S101), that is, when the vehicle is stopped, the content value of the content is changed to a content value during stop in S104, the area suitability of the area is changed to area suitability during stop in S105 and, after that, the value changing process is finished.

It is assumed that the content values during driving/during stop for a content and the area suitability during driving/during stop for an area are predetermined. For example, it is considered that the value of a content obtained from the multimedia ECU 41 decreases during driving from the safety viewpoint or the like as compared with that during stop. For such a content, the content value during driving is set to be smaller than that during stop. It is also considered that the suitability of an area where the movement of the visual line becomes extremely smaller increases during driving. Therefore, for such an area, the area suitability during driving is set to be larger than that during stop.

Next, the above-described display control apparatus will be described with a more concrete example.

Figure 13:
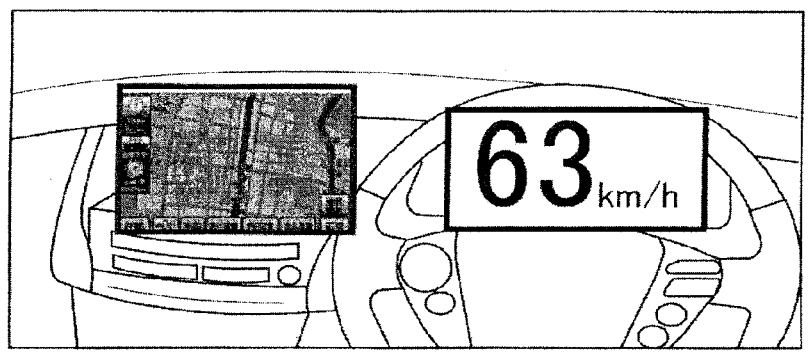
FIGS. 13(a) and 13(b) are diagrams illustrating a concrete example of the display control process.
Figure 13:
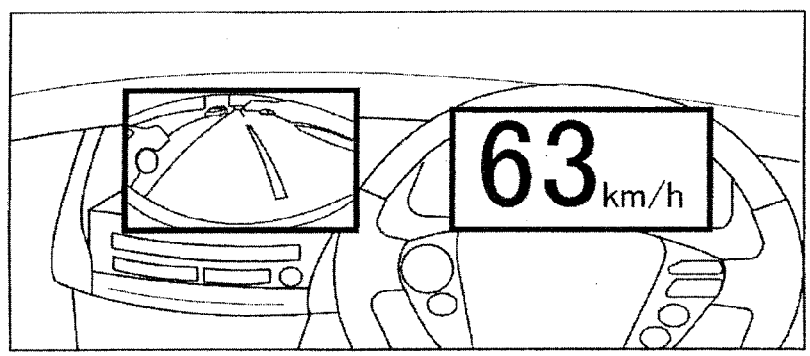

The case where, as illustrated in FIG. 13(a), the contents of "vehicle speed" and "map" for navigation are active will be considered. The "vehicle speed" content is digital display of vehicle speed, and the content "map" is map display for navigation.

On the other hand, areas as display objects are the area of "meter panel" and the area of the "liquid crystal display device" disposed in the center of the vehicle.

As described above, the content values are expressed by the content value [driver], the content value [assistant-driver-seat passenger], and the content value [rear-seat passenger]. Those values will be described as C[D], C[A], and C[R]. The content characteristics are expressed by the visual-line characteristic, the expression power characteristic, and the operation characteristic. Those characteristics will be described as EC, RC, and OC.

Concretely, it is assumed that the "vehicle speed" contents are C[D]=50, C[A]=10, C[R]=10, EC=5, RC=3, and OC=2.

It is assumed that the "map" contents are C[D]=40, C[A]=40, C[R]=30, EC=4, RC=4, and OC=4.

Similarly, the area suitability is expressed by area suitability [driver], area suitability [assistant-driver-seat passenger], and area suitability [rear-seat passenger]. The suitability is expressed as A[D], A[A], and A[R]. The area characteristics are expressed by the visual-line characteristic, the expression power characteristic, and the operation characteristic. Those characteristics will be described as EA, RA, and OA.

Concretely, it is assumed that the "meter panel" areas are A[D]=10, A[A]=2, A[R]=2, EA=4, RA=3, and OA=3.

It is assumed that the "liquid crystal display" areas are A[D]=7, A[A]=10, A[R]=5, EA=3, RA=4, and OA=5.

One combination list (hereinbelow, called "combination list A") is made of "vehicle speed"-"meter panel", "map"-"liquid crystal display device".

Another combination list (hereinbelow, called "combination list B") is made of "vehicle speed"-"liquid crystal display device", "map"-"meter panel" (S150 in FIG. 6). Evaluation values of the combinations are calculated in practice (S180 in FIG. 7) and total of evaluation values of each combination list is calculated. Description will be continued on assumption that a driver, an assistant-driver-seat passenger, and a rear-seat passenger exist. That is, K[D]=K[A]=K[R]=1.

(1) Total of Evaluation Values of Combination List A
(1-1) Evaluation Value of "Vehicle Speed"-"Meter Panel"

$DE = K[D] \times C[D] \times A[D] = 1 \times 50 \times 10 = 500$ $AE = K[A] \times C[A] \times A[A] = 1 \times 10 \times 2 = 20$ $RE = K[R] \times C[R] \times A[R] = 1 \times 10 \times 2 = 20$ Since EC=5 and EA=4, the visual line suitability is "8" on the basis of FIG. 4(a). Since RC=3 and RA=3, the expression power suitability is "10" on the basis of FIG. 4(b). Since OC=2 and OA=3, the operation suitability is "10" on the basis of FIG. 4(c).

When weighting coefficients K1 to K7 are set to "1", $DCE = (8+10+10)/3 = 9.333\ldots$ $ACE = (10+10)/2 = 10$ $RCE = (10+10)/2 = 10$ Therefore,
Evaluation value=DE×DCE+AE×ACE+RE×RCE=4666+200+200=5066

(1-2) "Map"-"Liquid Crystal Display Device"

$DE = K[D] \times C[D] \times A[D] = 1 \times 40 \times 7 = 280$ $AE = K[A] \times C[A] \times A[A] = 1 \times 40 \times 10 = 400$ $RE = K[R] \times C[R] \times A[R] = 1 \times 30 \times 5 = 150$ Since EC=4 and EA=3, the visual line suitability is "8" on the basis of FIG. 4(a). Since RC=4 and RA=4, the expression power suitability is "10" on the basis of FIG. 4(b). Since OC=4 and OA=5, the operation suitability is "10" on the basis of FIG. 4(c).

When the weighting coefficients K1 to K7 are set to "1", $DCE = (8+10+10)/3 = 9.333\ldots$ $ACE = (10+10)/2 = 10$ $RCE = (10+10)/2 = 10$ Therefore,
Evaluation value=DE×DCE+AE×ACE+RE×RCE=2613+4000+1500=8113

From (1-1) and (1-2), the total of the evaluation values of the combination list A is "13179".

(2) Total of Evaluation Values of Combination List B
(2-1) Evaluation Value of "Vehicle Speed"-"Liquid Crystal Display Device"

$DE = K[D] \times C[D] \times A[D] = 1 \times 50 \times 7 = 350$ $AE = K[A] \times C[A] \times A[A] = 1 \times 10 \times 10 = 100$ $RE = K[R] \times C[R] \times A[R] = 1 \times 10 \times 5 = 50$ Since EC=5 and EA=3, the visual line suitability is "6" on the basis of FIG. 4(a). Since RC=3 and RA=4, the expression power suitability is "10" on the basis of Hg. 4(b). Since OC=2 and OA=5, the operation suitability is "10" on the basis of FIG. 4(c).

When weighting coefficients K1 to K7 are set to "1", $DCE = (6+10+10)/3 = 8.666\ldots$ $ACE = (10+10)/2 = 10$ $RCE = (10+10)/2 = 10$ Therefore,
Evaluation value=DE×DCE+AE×ACE+RE×RCE=3033+1000+500=4533

(2-2) "Map"-"Meter Panel"

$DE = K[D] \times C[D] \times A[D] = 1 \times 40 \times 10 = 400$ $AE = K[A] \times C[A] \times A[A] = 1 \times 40 \times 2 = 80$ $RE = K[R] \times C[R] \times A[R] = 1 \times 30 \times 2 = 60$ Since EC=4 and EA=4, the visual line suitability is "10" on the basis of FIG. 4(a). Since RC=4 and RA=3, the expression power suitability is "8" on the basis of FIG. 4(b). Since OC=4 and OA=3, the operation suitability is "8" on the basis of Hg. 4(c).

When the weighting coefficients K1 to K7 are set to "1", $DCE = (10+8+8)/3 = 8.666\ldots$ $ACE = (8+8)/2 = 8$ $RCE = (8+8)/2 = 8$ Therefore,
Evaluation value=DE×DCE+AE×ACE+RE×RCE=3466+640+480=4586

From (2-1) and (2-2), the total of the evaluation values of the combination list B is "9119".

From the above, the combination list A is selected (S240 in FIG. 7), the combination is read (S250), and content display is performed (S260) as illustrated in FIG. 13(a).

It is assumed that a shift range is set to R so that the content in the "back monitor" enters the active state".

Concretely, it is assumed that the contents in the "back monitor" are C[D]=45, C[A]=40, C[R]=30, EC=4, RC=4, and OC=4.

Since three contents and two areas exist at this time, six combination lists are extracted (S150 in FIG. 6). They are called combination lists A to F. Evaluation values of the combinations are actually calculated (S180), and total of evaluation values of each combination list is calculated. It is also assumed that a driver, an assistant-driver-seat passenger, and a rear-seat passenger exist. That is, K[D]=K[A]=K[R]=1.

(1) Total of Evaluation Values of Combination List A
The combination list A is made of combinations of "vehicle speed"-"meter panel" and "map"-"liquid crystal display device". It becomes "13179" as described above.

(2) Total of Evaluation Values of Combination List B

The combination list B is made of combinations of "vehicle speed"-"liquid crystal display device" and "map"-"meter panel". It becomes "9119" as described above.

(3) Total of Evaluation Values of Combination List C

The combination list C is made of combinations of "vehicle speed"-"meter panel" and "back monitor"-"liquid crystal display device".

(3-1) The evaluation value of "vehicle speed"-"meter panel" is "5066".

(3-2) Evaluation Value of "Back Monitor"-"Liquid Crystal Display Device"

$DE = K[D] \times C[D] \times A[D] = 1 \times 45 \times 7 = 315$ $AE = K[A] \times C[A] \times A[A] = 1 \times 40 \times 10 = 400$ $RE = K[R] \times C[R] \times A[R] = 1 \times 30 \times 5 = 150$ Since EC=4 and EA=3, the visual line suitability is "8" on the basis of FIG. 4(a). Since RC=4 and RA=4, the expression power suitability is "10" on the basis of FIG. 4(b). Since OC=4 and OA=5, the operation suitability is "10" on the basis of FIG. 4(c).

When weighting coefficients K1 to K7 are set to "1", $DCE = (8+10+10)/3 = 9.333\ldots$ $ACE = (10+10)/2 = 10$ $RCE = (10+10)/2 = 10$ Therefore, Evaluation value = $DE \times DCE + AE \times ACE + RE \times RCE = 2940 + 4000 + 1500 = 8440$ From the above-described (3-1) and (3-2), the total of the evaluation values of the combination list C becomes "13506".

(4) Total of Evaluation Values of Combination List D

The combination list D is made of combinations of "vehicle speed"-"liquid crystal display device" and "back monitor"-"meter panel".

(4-1) The evaluation value of "vehicle speed"-"liquid crystal display device" is "4533".

(4-2) Evaluation Value of "Back Monitor"-"Meter Panel"

$DE = K[D] \times C[D] \times A[D] = 1 \times 45 \times 10 = 450$ $AE = K[A] \times C[A] \times A[A] = 1 \times 40 \times 2 = 80$ $RE = K[R] \times C[R] \times A[R] = 1 \times 30 \times 2 = 60$ Since EC=4 and EA=4, the visual line suitability is "10" on the basis of FIG. 4(a). Since RC=4 and RA=3, the expression power suitability is "8" on the basis of FIG. 4(b). Since OC=4 and OA=3, the operation suitability is "8" on the basis of FIG. 4(c).

When weighting coefficients K1 to K7 are set to "1", $DCE = (10+8+8)/3 = 8.666\ldots$ $ACE = (8+8)/2 = 8$ $RCE = (8+8)/2 = 8$ Therefore, Evaluation value = $DE \times DCE + AE \times ACE + RE \times RCE = 3900 + 640 + 480 = 5020$ From the above-described (4-1) and (4-2), the total of the evaluation values of the combination list D becomes "9553".

(5) Total of Evaluation Values of Combination List E

The combination list E is made of combinations of "map"-"meter panel" and "back monitor"-"liquid crystal display device".

(5-1) The evaluation value of "map"-"meter panel" becomes "4586".

(5-2) The evaluation value of "back monitor"-"liquid crystal display device" becomes "8440".

Therefore, the total of the evaluation values of the combination list E becomes "13026".

(6) Total of Evaluation Values of Combination List F

The combination list F is made of combinations of "map"-"liquid crystal display device" and "back monitor"-"meter panel".

(6-1) the Evaluation Value of "Map"-"Liquid Crystal Display Device" is "8113".

(6-2) The evaluation value of "back monitor"-"meter panel" is "5020".

Therefore, the total of the evaluation values of the combination list F becomes "13133".

From the above, the combination list C is selected (S240 in FIG. 7), the combination is read (S250), and the content display is performed (S260) as illustrated in FIG. 13(b).

Next, effects displayed by the display control apparatus 1 of the embodiment will be described.

In the embodiment, a content list is generated from contents which are in the active state (S110 in FIG. 6), the essential exclusion constraint equation is processed (S120), and a content list satisfying the essential exclusion constraint equation is generated (S130). On the other hand, an area list as a combination of usable areas is generated (S140), and a combination of a content and an area is extracted as a combination list (S150). An evaluation value based on a content value and area suitability is calculated for a combination included in the combination list (S180 in FIG. 7), the evaluation value of each of combination lists is obtained as an evaluation reference value, and a combination list whose evaluation reference value is the maximum is selected (S240), thereby determining a combination of a content and an area.

That is, in the embodiment, a content list and an area list are generated first and, on the basis of both of the lists, a combination of an area and a content is extracted as a combination list. That is, a content whose value is large is not preferentially assigned to an area, but a best combination is selected from combinations.

In other words, in the embodiment, the content managing unit manages content parameters associated with a plurality of contents. The content parameters include at least a content evaluation value expressing priority of display of a content associated or a content size expressing size of display data. The assignment control unit generates a plurality of combination lists of a plurality of contents and a plurality of display areas. At this time, the evaluation value obtaining unit obtains combination evaluation values by the plurality of combination lists on the basis of the content parameters. The assignment control unit compares the combination evaluation values by the combination lists and selects a combination list.

That is, on precondition of further providing the area managing unit storing area parameters associated with the plurality of display areas and including an area evaluation value expressing assignment priority of the content or an area size expressing size of a display region of the area, the evaluation value obtaining unit calculates a combination evaluation value from the content parameter and the area parameter. More specifically, the content parameter includes a content evaluation value, the area parameter includes an area evaluation value, the content evaluation value and the area evaluation value are set for each display target person as a display object in a vehicle, and the evaluation value obtaining unit calculates a combination evaluation including a target evaluation value of each display target person on the basis of the content evaluation value and the area evaluation value. At this time, the assignment control unit compares combination evaluation values by combination lists and selects a combination list having a higher combination evaluation value, thereby determining a combination of a content and an area.

In such a manner, different from the case of simply assigning priority like in the conventional technique, a combination list is selected from extracted combination lists and a combination of a content and an area is determined. Consequently, a content and an area can be combined so as to be appropriate in total.

In the embodiment, the display state is included in the attributes of a content (refer to FIG. 2), and a content list is generated by using contents whose display state is the "active state" (S110 in FIG. 6). In such a manner, whether a content is set to a display object or not can be easily managed.

Further, in the embodiment, an essential exclusion constraint equation as display information specifying essential exclusion display of a content is stored in the assignment managing unit 13, and the content assignment control unit 14 processes the essential exclusion constraint equation (S120 in FIG. 6), and generates a content list based on the essential exclusion constraint equation (S130). In such a manner, a combination of a content and an area is determined including the essential exclusion display of the content, and more appropriate information display can be performed.

In the embodiment, the area managing unit 12 has a hierarchical data structure of areas (refer to FIGS. 3(a) and 3(b)) and generates an area list as a combination of usable areas on the basis of the hierarchical structure (S140 in FIG. 6). In such a manner, the area list based on the hierarchical data structure can be generated.

Further, in the embodiment, the assignment managing unit 13 preliminarily manages assignment information of a specific content to a specific area (refer to FIG. 10(c)) and extracts a combination list of a content and an area satisfying the assignment information (S150 in FIG. 6). As a result, a combination list in which the assignment information is considered is extracted, so that designability of the screen of the display device can be assured. A content desired by the user can be assigned to an area desired by the user.

In the embodiment, a content size is associated with a content, and an area size is associated with an area (refer to FIG. 2). While comparing the content size and the area size, a combination list is extracted so that the content lies within the area (S150 in FIG. 6). As a result, without necessity of scrolling a content so as to be displayed or necessity of reducing the size of a content so as to be displayed, information can be displayed in a manner that it can be easily grasped by the user.

Further, in the embodiment, a combination list is extracted so that a content required to be essentially displayed is included (S150 in FIG. 6). Since a content required to be essentially displayed is included in a combination at a stage of extracting a combination list, the content can be displayed reliably.

In the embodiment, the content managing unit 11 manages a content so as to associate a content characteristic indicative of a characteristic of the content, and the area managing unit 12 manages an area so as to associate an area characteristic indicative of a characteristic of the area. The content association control unit 14 calculates an evaluation value in consideration of a characteristic evaluation value calculated on the basis of the content characteristic and the area characteristic (S180 in FIG. 7) and determines a combination of a content and an area (S240). By the operation, the combination of the content and the area is determined in consideration of the characteristics of the content and the area, the more appropriate combination of the content and the area can be determined.

Concretely, the visual line suitability based on the visual line characteristics of a content and an area is obtained, and a characteristic evaluation value is calculated. The expression power suitability based on the expression power characteristics of a content and an area is obtained, and a characteristic evaluation value is calculated. Further, an operation suitability based on the operation characteristics of a content and an area is obtained, and a characteristic evaluation value is calculated. That is, the content parameter includes a content characteristic which is at least one of a visual-line characteristic, an expression power characteristic, and an operation characteristic, the area parameter includes an area characteristic corresponding to the content characteristic, and the evaluation value obtaining unit calculates the combination evaluation value including a characteristic evaluation value on the basis of the content characteristic and the area characteristic. In such a manner, the combination of a content and an area can be determined on the basis of the characteristic evaluation values on the visual line, expression power, and operability, and a proper combination of the content and the area can be determined.

At this time, in the embodiment, a suitability table which obtains suitability for calculating a characteristic evaluation value from a content characteristic and an area characteristic is stored (refer to FIGS. 4(a) to 4(c)). In such a manner, the characteristic evaluation value can be derived relatively easily from the content characteristic and the area characteristic.

In the embodiment, on the basis of the driving state of a vehicle, the values of a content and an area are changed (S100 in FIG. 6). Concretely, in the vehicle driving state (YES in S101 in FIG. 11), the values are changed to the content value and area suitability during driving (S102 and S103). On the other hand, in the case where a vehicle is stopped (NO in S101 in FIG. 11), the values are changed to a content value and area suitability during stop (S104 and S105). As a result, the content can be assigned to a more appropriate area.

Further, in the embodiment, various contents are obtained via a network in a vehicle (refer to FIG. 1). At this time, the content managing unit 11 similarly performs management by associating "content value", "content size", "display state", and "content characteristic" to each of various contents (refer to FIG. 2). In such a manner, regardless of the kind of a content, the content can be assigned to an area by the same algorism.

Similarly, in the embodiment, "area suitability", "area size", and "area characteristic" are associated to a plurality of areas in the display devices A to C 21 to 23, thereby managing the areas (refer to FIG. 2). Consequently, even when the display devices 21 to 23 are different, an area to which a content has to be assigned can be determined by the same algorithm.

The disclosure is not limited to the foregoing embodiments but can be carried out in various forms without departing from the gist.

Other Embodiments (1) In the foregoing embodiment, as illustrated in FIG. 2, the content managing unit 11 manages a content by associating four attributes of "content value", "content size", "display state", and "content characteristic" to the content. The area managing unit 12 manages, as illustrated in FIG. 2, an area by associating three attributes of "area suitability", "area size", and "area characteristic" to the area. Consequently, an evaluation value including a target evaluation value calculated from the content value and the area suitability and a characteristic evaluation value calculated from the content characteristic and the area characteristic is calculated as an evaluation reference value.

Figure 12:
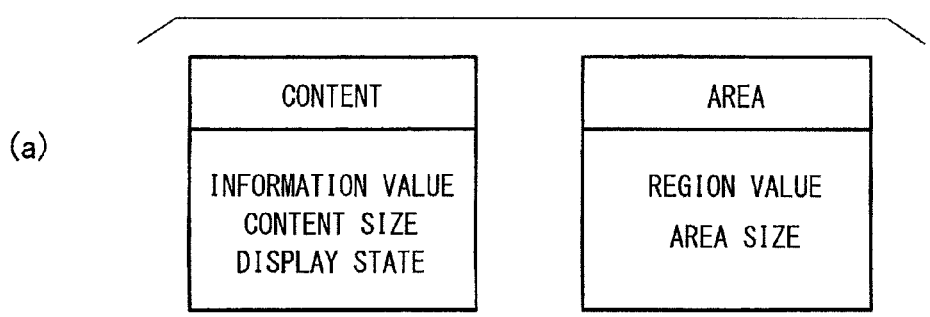
FIGS. 12(a) and 12(b) are diagrams illustrating attributes associated with a content and an area in another embodiment.
Figure 12:
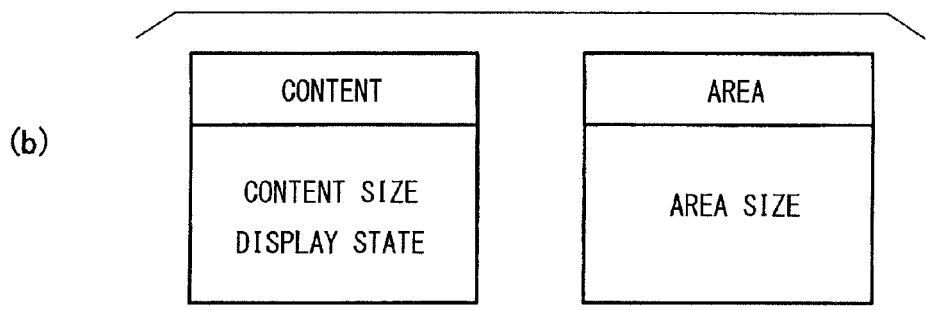

As illustrated in FIG. 12(a), the content managing unit 11 may manage a content by associating three attributes of "information value", "content size", and "display state" to the content, and the area managing unit 12 may manage an area by associating two attributes of "region value" and "area size" to the area.

The information value denotes the degree of importance of a content. The information value generally becomes higher as a content whose urgency such as "warning information" becomes higher and "vehicle speed", "engine rotational speed", and the like as contents regarding a driving state follow. Contents such as "map" and "audio information" for navigation have a relatively low information value.

The region value indicates the degree of importance of an area. Generally, the more the visibility of an area is, the higher the region value is set. For example, the region value of the area of the head-up display using the windshield is high.

In this case, in S150 in FIG. 6, like the foregoing embodiment, one area list and one content list are taken out and a combination list is extracted on the basis of assignment information, size, and a flag indicating whether the content is a content required to be essentially displayed. Further, a combination in which the information value is larger than the region value is extracted. That is, a combination in which the information value is smaller than the region value is excluded. That is, on precondition of further providing the area managing unit storing area parameters associated with the plurality of display areas and including an area evaluation value expressing assignment priority of the content or an area size expressing size of a display region of the area, the area parameter includes the area evaluation value, and the assignment control unit compares the content evaluation value and the area evaluation value and determines a combination in which the content evaluation value is larger than the area evaluation value as an area in which the content can be displayed and to which the content can be assigned.

In S180 in FIG. 7, the information value itself of a content in the n-th combination in the m-th combination list is obtained. In S240, on the basis of the totals of information values in combination lists, a combination list having the largest total of the information values is selected. That is, the content parameters include a content evaluation value (in this case, the information value), and the evaluation value obtaining unit calculates a total value of content evaluation values in each combination list, compares the combination evaluation values of the combination lists, and selects the combination list having the largest combination evaluation value.

In the foregoing embodiment, as already described, the area managing unit 12 manages the areas in the display devices A 21 to C 23 by the hierarchical data structure. As an example, the areas of the display device A 21 are layered as illustrated in FIGS. 3(a) and 3(b).

Figure 14:
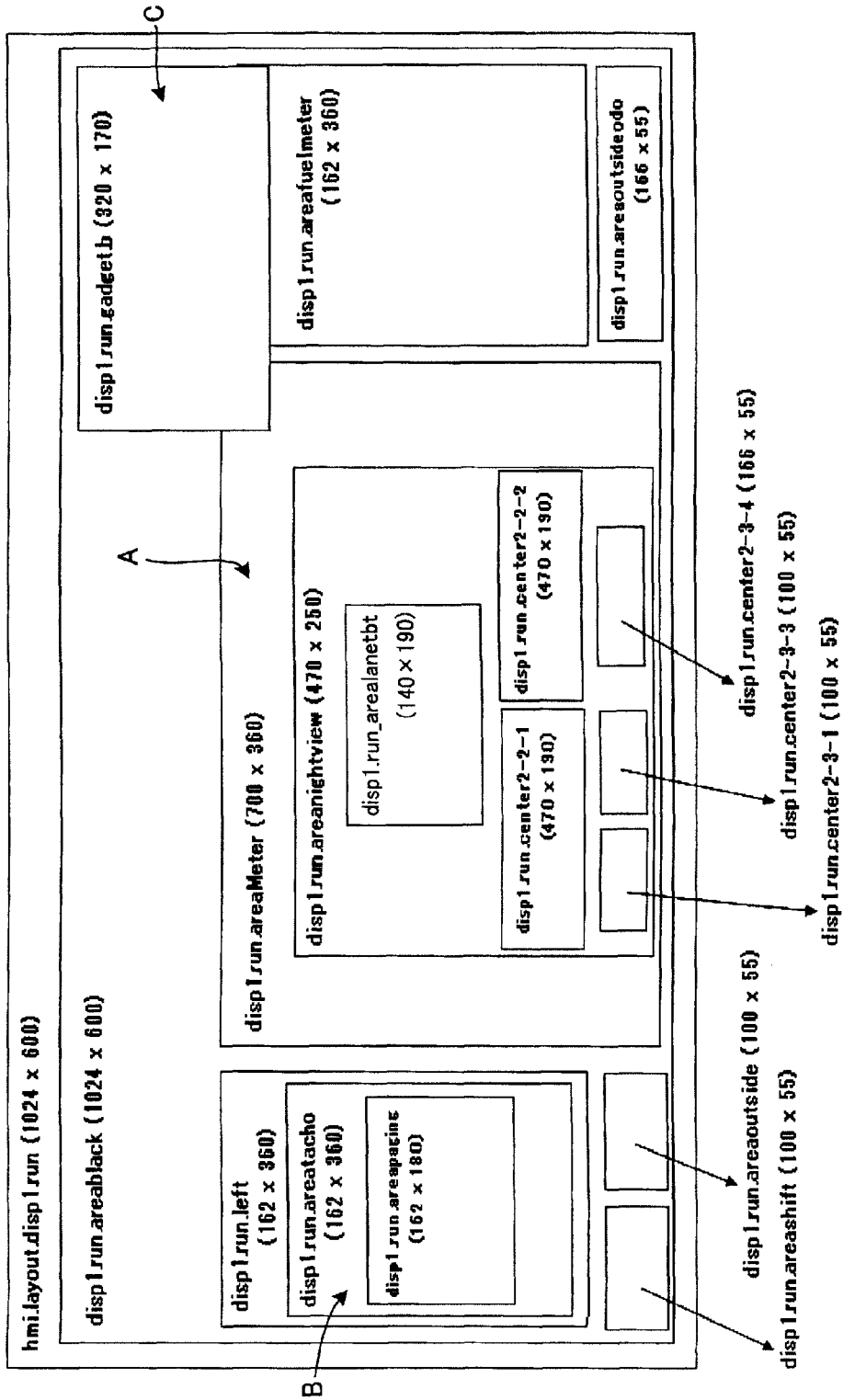
FIG. 14 is a diagram illustrating sections of areas set in a meter panel.

More concretely, in the case where the display device A 21 is a meter panel, for example, the area is partitioned as illustrated in FIG. 14. As illustrated in FIG. 14, in the meter panel, a center area indicated by reference character A, a left-side area indicated by reference character B, a right-upper area indicated by reference character C, and the like are set. The center area is layered, and a plurality of contents can be assigned to the area.

Figure 15:
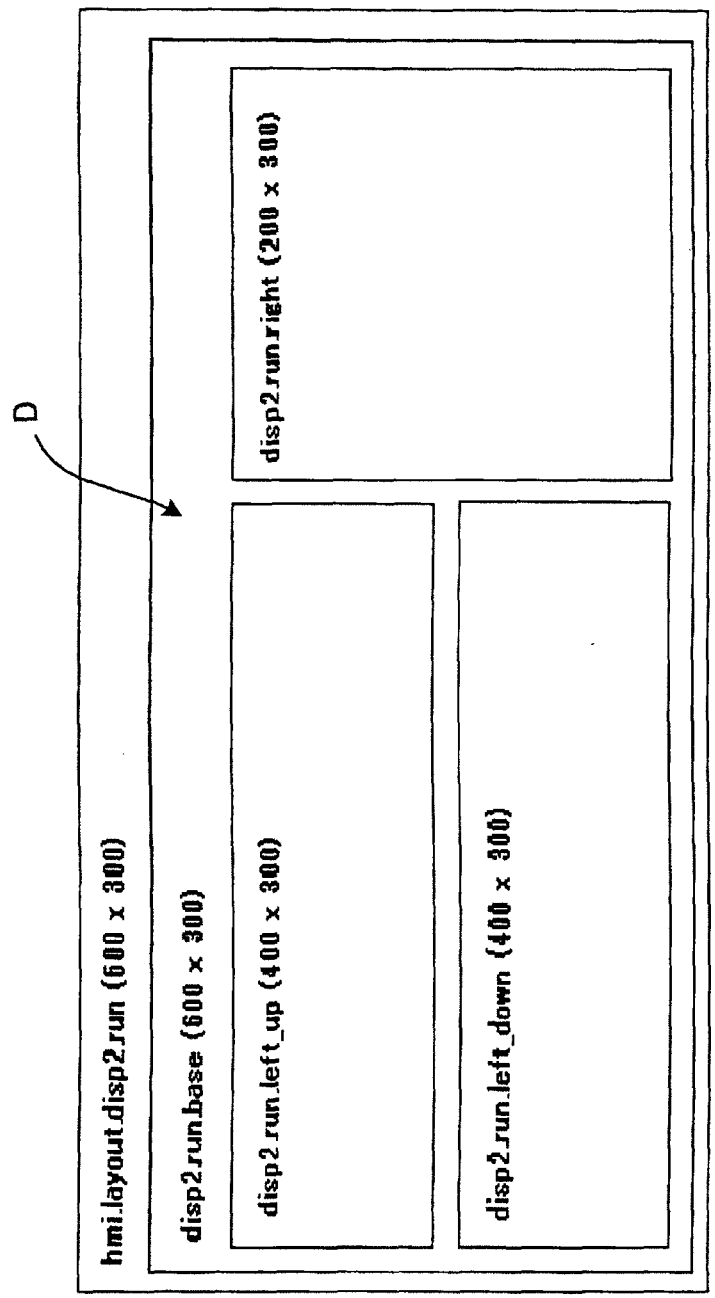
FIG. 15 is a diagram illustrating sections of areas set in a head-up display.

In the case where the display device B 22 is a head-up display, for example, the area is partitioned as illustrated in FIG. 15. An area indicated by reference character D is layered, and a plurality of contents can be assigned to the area.

Figure 16:
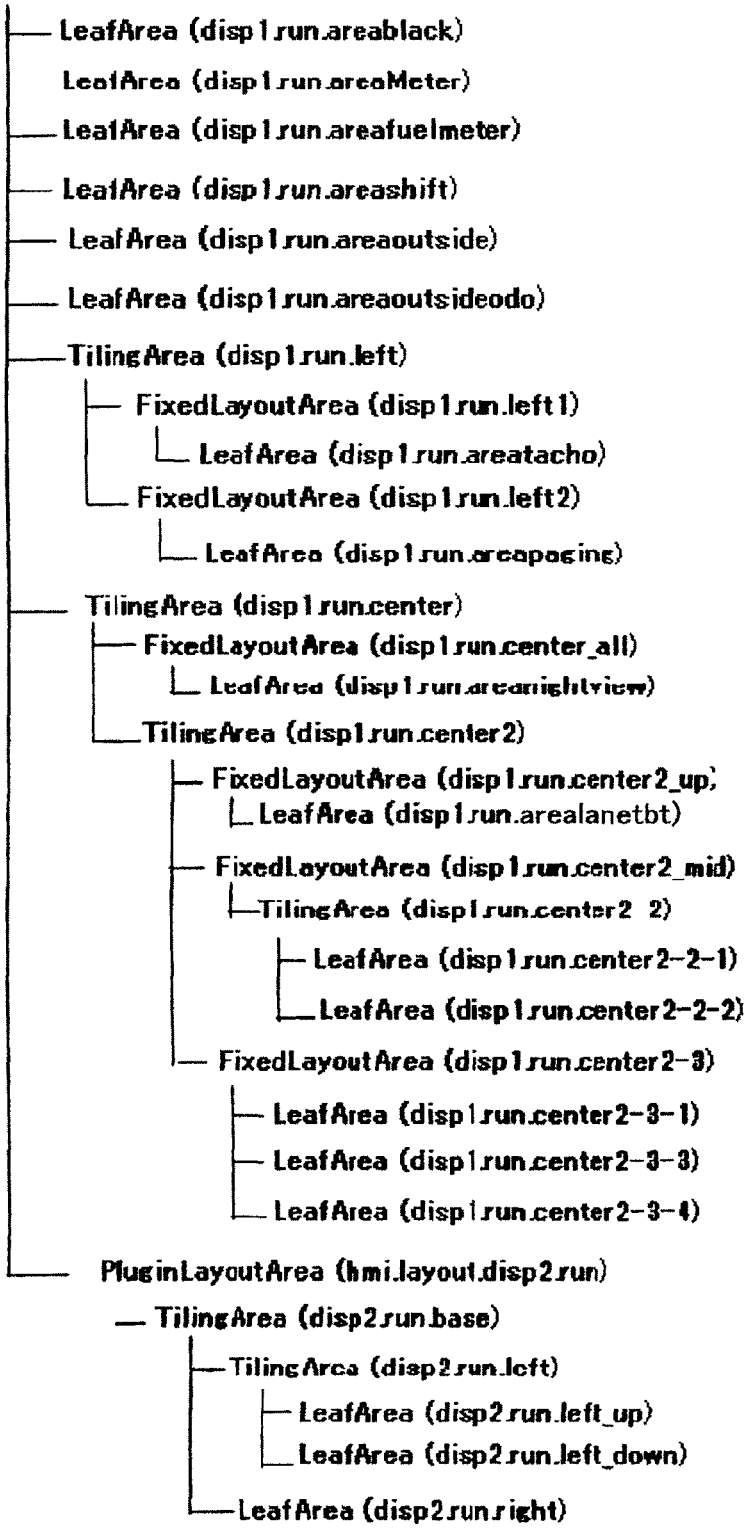
FIG. 16 is a diagram illustrating a hierarchical structure of areas in the meter panel and the head-up display.

The area hierarchical structure in this case is as illustrated in FIG. 16. In the case where the display device B 22 as the head-up display is attached afterward, a hierarchy structure is added as Plugin Layout Area as shown by a broken line.

Contents assigned to such areas are illustrated in FIG. 17. The contents include "night view", "gadget L", "speed ("vehicle speed" displayed in the meter panel", "speed ("vehicle speed" displayed in the head-up display)", "lane/turn-by-turn", "tachometer", "ACC (Adaptive Cruise Control)", "energy flow", "shift position", "fuel gauge", "outside air temperature", "odometer", "gadget Small", "mail Small", and "mail Large". With each of the contents, an information value and a content size are associated. During driving, the information value of the content "gadget Large" is "0" (S102 in FIG. 11).

Figure 18:
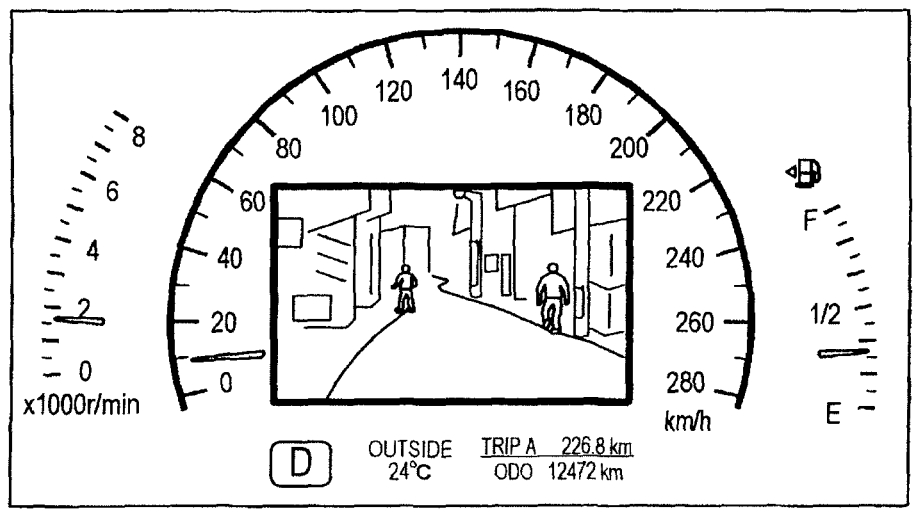
FIGS. 18(a) and 18(b) are diagrams illustrating a screen transition in the meter panel.
Figure 18:
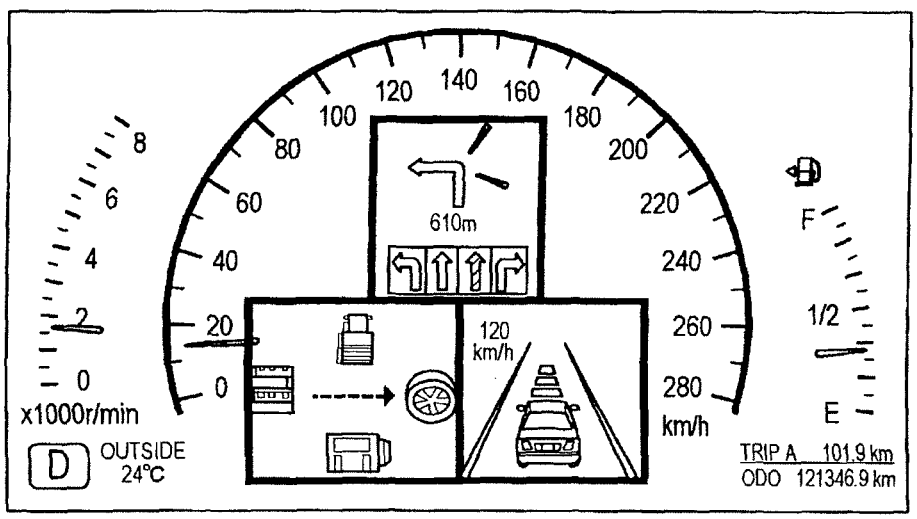

On precondition that the region value of an area is larger than the information value of a content, in FIG. 18(a), the content of "night view" having the largest information value is displayed in the center area of the meter panel since the information value of "night view" is "130" as illustrated in FIG. 19(a). Since the total of the contents "ACC" and "energy flow" is only "120", in this case, the content of "night view" is singularly displayed in the center.

When there is a display request of the content "lane/turn by turn" for navigation, the information value in the case of singularly displaying the content of "night view" in the center area of the meter panel and the information value in the case of displaying the three contents of "lane/turn by turn", "ACC", and "energy flow" in the center area are compared. The former case is 130, and the latter case is 95+85+35=215 (refer to FIG. 19(b)). Therefore, the combination list of the latter case is selected (S240 in FIG. 7). The display mode of the center area of the meter panel is as illustrated in FIG. 18(b).

Figure 20:
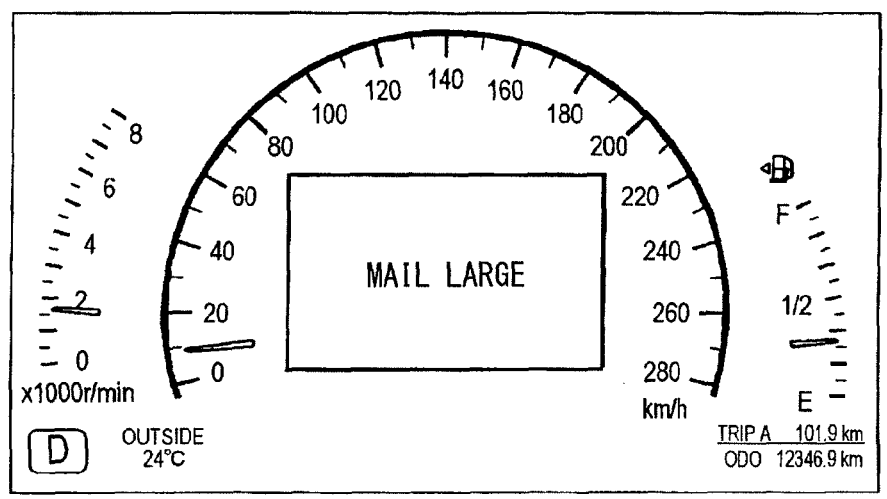
FIGS. 20(a) and 20(b) are diagrams illustrating essential display of mail content.
Figure 20:
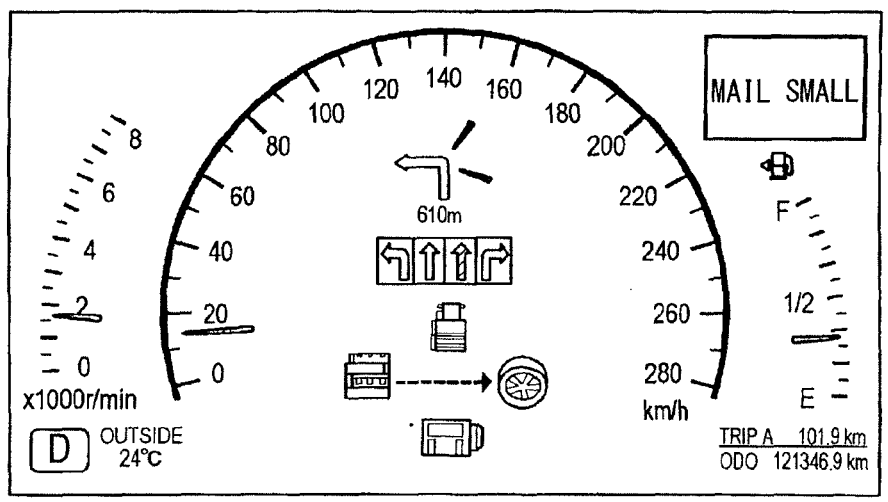

For the contents "mail Large" and "mail Small", it is assumed that there is an essential exclusion relation equation "mail Large"^"mail Small". It means that only "mail Large" is displayed or only "mail Small" is displayed. Therefore, in the case where the content "mail Large" is displayed in the center area of the meter panel as illustrated in FIG. 20(a), for example, when a request to display "lane/turn by turn" is made, the information value in the case of singularly displaying the content "mail Large" and the information value in the case of displaying two contents of "lane/turn by turn" and "energy flow" are compared. The former case is 50, and the latter case is 95+35=130 (refer to FIG. 17). Therefore, the content "mail Large" is to be moved out from the center area of the meter panel. However, based on the essential exclusion relation equation of "mail Large"^ "mail Small", the content "mail Small" has to be essentially displayed. Therefore, as illustrated in FIG. 20(b), the content "mail Small" is displayed in the right upper area in the meter panel.

In the case of attaching the display device B 22 as the head-up display afterwards, as described above, the hierarchical structure is added as PluginLayoutArea (refer to FIG. 16).

Figure 21:
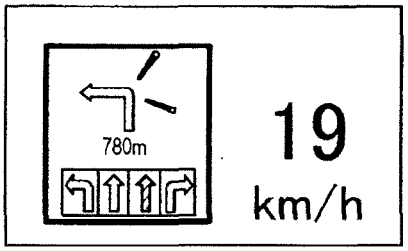
FIGS. 21(a) and 21(b) are diagrams illustrating a screen transition in the meter panel and the head-up display.
Figure 21:
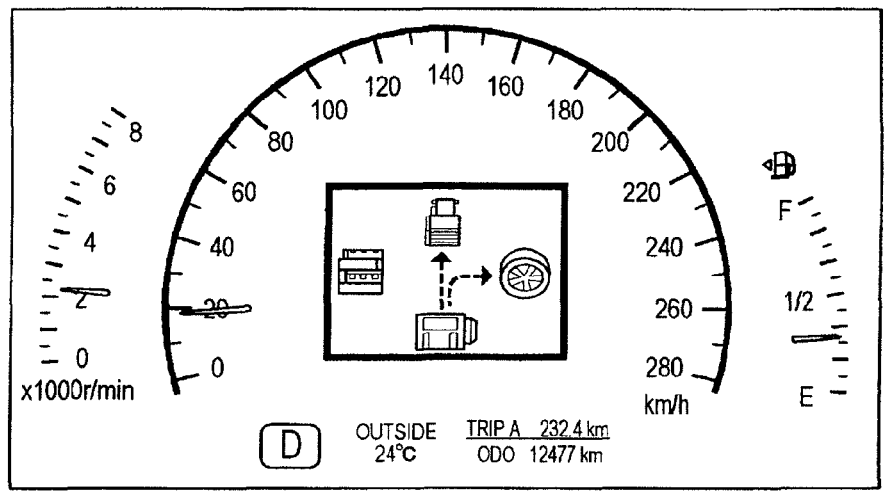
Figure 21:
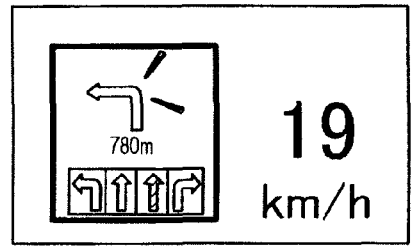
Figure 21:
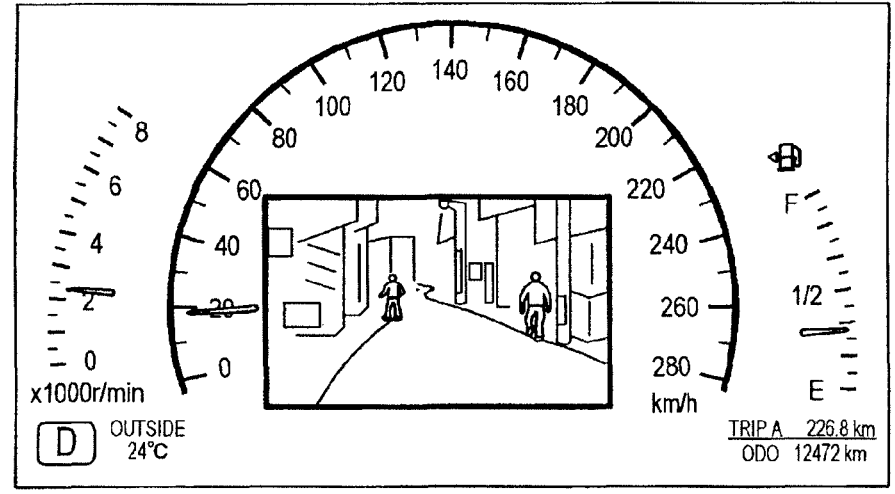

In FIG. 21(a), the contents of "lane/turn by turn" and "speed" are displayed in the area of the head-up display, and the content "energy flow" is displayed in the center area of the meter panel. When the content "night view" becomes the active state, as illustrated in FIG. 21(b), the total of the information values becomes larger, so that the content "night view" is displayed in the center area of the meter panel in place of the content "energy flow".

Also with such a configuration, effects similar to those of the embodiment are produced. Particularly, in this case, a combination list is extracted by the balance between the information value and the region value. As a result, a proper combination between the content and the area can be determined.

(2) As illustrated in FIG. 12(b), it may be also constructed that the content managing unit 11 manages a content by associating two attributes of "content size" and "display state" to the content, and the area managing unit 12 manages an area by associating the attribute "area size" to the area.

In this case, in S150 in FIG. 6, like the foregoing embodiment, one area list and one content list are taken out and a combination list is extracted on the basis of assignment information, size, and a flag indicating whether the content is a content required to be essentially displayed.

That is, on precondition of further providing the area managing unit storing area parameters associated with a plurality of display areas and including an area evaluation value expressing assignment priority of the content or an area size expressing size of a display region of the area, the assignment control unit compares the content size and the area size in each combination list and, in the case where the content size is smaller than the area size, determines that the content can be assigned to the area as the area in which the content can be displayed.

In S180 in FIG. 7, the difference between the content size and the area size in the n-th combination in the m-th combination list is calculated. For example, the difference of pixel numbers in at least one of the vertical and horizontal directions is calculated. In the case of calculating differences in both of the vertical and horizontal directions, a difference correspondence value based on the two differences is calculated. For example, a value obtained by adding the two differences is set as the difference correspondence value. In S240, based on the total of differences (difference correspondence values) in combination lists, a combination list in which the total of differences (difference correspondence values) is the smallest is selected.

With such a configuration, effects similar to those of the embodiment are produced. Particularly, in this case, a part where nothing is displayed does not increase around a content, and information can be displayed so as to be easily grasped by the user.

In the embodiment, an evaluation value is calculated with respect to all of combinations of contents and areas. However, the invention is not limited to the mode. It is also possible to obtain possible combinations and evaluations of only specific contents and specific areas and determine a combination of a content and an area on the basis of the obtained evaluation value.

Although combinations of contents and areas are extracted as a list in the foregoing embodiment, the disclosure is not limited to the mode. Without extracting combinations by a data structure in the list form, combinations may be defined by variables such as pointers.

Others

A. By managing contents and areas by their attributes, various kinds of contents can be flexibly assigned to a plurality of areas in the display devices 21 to 23.

Therefore, in the display control apparatus 1 of the embodiment, for example, in the case where any of the display devices A to C 21 to 23 fails, by updating management information by the area managing unit 12, contents can be assigned to areas without changing the algorithm.

Similarly, as illustrated in FIG. 1, it is easy to additionally connect a display device D 50. In this case as well, it is sufficient for the area managing unit 12 to update the management information in accordance with addition of the display device D 50. For example, the display device D 50 is a cellular phone such as a smartphone, an information terminal called a PDA, or the like. In this case, area information may be obtained from the display device D 50 itself. The content managing unit 11 may obtain contents from the display device D 50.

B. Although the value changing process is executed in the foregoing embodiment, since the process is not essential, the value changing process may be omitted. The process may be executed only when a predetermined condition is satisfied.

C. Although both of a content value and area suitability are changed in the value changing process (S100 in FIG. 6) in the foregoing embodiment, it is also possible to fix one of a content value and area suitability and change only the other.

Although a content value and area suitability are changed on the basis of a driving condition of a vehicle, which is whether the vehicle is driving or not in the embodiment, they may be changed according to finer driving conditions such as low-speed driving and high-speed driving. For example, using a system capable of calculating a load of a driver or the like, they may be changed in consideration of a load of the driver or the like.

Further, like a content value and area suitability, the suitability tables illustrated in FIGS. 4(a) to 4(c) may be changed on the basis of the driving state of a vehicle. In such a manner, a characteristic evaluation value according to the vehicle state can be derived, and a characteristic evaluation value becomes more appropriate.

D. In the embodiment, a content size and an area size are compared, and an area in which a content can lies is picked up. Alternatively, for example, reduction display of contents or scroll display of contents is performed and a content is assigned to an area whose area size is smaller than the content size.

E. Although the visual-line characteristic, the expression power characteristic, and the operation characteristic are employed as the content characteristic and the area characteristic in the embodiment, other characteristics can be also employed.

F. In the embodiment, with respect to an essential exclusion relation of contents, an essential exclusion constraint equation is processed (S120 in FIG. 6) and a content list based on the essential exclusion constraint equation is generated (S130). Similarly, also with respect to an essential exclusion relation of areas, an essential exclusion constraint equation can be specified and similarly processed. In such a manner, an area list can be generated with inclusion of an essential exclusion relation of areas. In this case, the essential exclusion constraint equation specifying the essential exclusion relation of areas corresponds to "area use information". In a configuration that the essential exclusion constraint equation is stored in the assignment managing unit 13, the assignment managing unit 13 corresponds to an "area use information storing unit".

The disclosure includes the following modes.

According to a first aspect of the present disclosure, a display control apparatus controls a display device mounted in a vehicle. The display device includes a screen having a plurality of areas set as display regions. The display control apparatus controls the display device so as to assign a content to a corresponding area and to display the content. The display control apparatus includes: a content managing unit managing the content by associating content information as an attribute of the content with a corresponding content; an area managing unit managing the area by associating area information as an attribute of the area with a corresponding area; and a content assignment control unit determining a combination of the content managed by the content managing unit and the area managed by the area managing unit. The content assignment control unit executes: a content list generating process for generating a content list according to contents managed by the content managing unit; an area list generating process for generating an area list as an available combination of the areas managed by the area managing unit; a combination list extracting process for extracting a combination of the areas and the contents as a combination list based on the area list and the content list; an evaluation reference value calculating process for calculating an evaluation reference value of each combination list based on the content information and the area information; and a combination determining process for selecting the combination list and determining a combination of the contents and the areas based on the evaluation reference value of each combination list.

In the display control apparatus, the content list generating process is performed to generate a content list from contents managed by the content managing unit. A content list is made of contents satisfying a predetermined condition. In some cases, a plurality of content lists are generated. The area list generating process is to generate an area list as a usable combination of the areas managed by the area managing unit. Considering partition of areas as will be described later, there is a case that a plurality of patterns exist as usable area combinations. Therefore, there is a case that a plurality of area lists are generated. Further, the combination list extracting process is to extract a combination of areas and contents as a combination list on the basis of an area list and a content list. For example, in the case of selecting one area and one content list and obtaining a combination of an area and a content, the combination is extracted as one combination list. When the combination list is extracted, by the evaluation reference value calculating process, evaluation reference values are calculated by the combination lists on the basis of content information and area information. In the combination determining process, on the basis of the evaluation reference values by the combination lists, for example, a combination list in which the evaluation reference value is maximum is selected to determine a combination between a content and an area. In the disclosure, a content list and an area list are generated first and, on the basis of the lists, a combination of areas and contents is extracted as a combination list. That is, a content having a large value is not preferentially assigned to an area, but a best combination is selected from the combinations. In such a manner, different from the case of simply preferentially assigning priority like in the conventional technique, a combination list is selected from extracted combination lists, and a combination of contents and areas is determined. Consequently, a content and an area can be combined so as to be appropriate in total.

As an alternative, the content information may include an information value indicative of a value of the content. The area information includes a region value indicative of a value of the area. In the combination list extracting process, the information value and the region value are compared with each other, and a combination, in which the information value is larger than the region value, is extracted as the combination list. In this case, for example, the information value of a content having high urgency is relatively large. For example, in an area in which the visual line movement during driving is small such as a head-up display, the region value is relatively large. In this case, in the combination list extracting process, an information value and a region value are compared, and a combination in which the information value is larger than the region value is extracted as a combination list. In such a manner, a combination list based on an information value and a region value is extracted. As a result, a proper combination of contents and areas can be determined.

As an alternative, in the evaluation reference value calculating process, a total value of information values of the contents in each combination list may be calculated as the evaluation reference value. In this case, when a total value of information values is used as an evaluation reference value, a combination list having a high information value is selected.

It is also possible to calculate evaluation values from content information and area information and use a total value of the evaluation values as an evaluation reference value.

For example, as an alternative, in the evaluation reference value calculating process, a total value of evaluation values calculated from the content information and the area information may be calculated as the evaluation reference value. In this case, a combination list is selected by an evaluation value of a combination of contents and areas and, as a result, an appropriate combination of contents and areas can be determined.

As an alternative, the content information may include a content value indicative of a value of information of each display target person. The area information includes an area suitability indicative of a suitability from a viewpoint of place of each display target person. In the evaluation reference value calculating process, a total value of the evaluation values including a target person evaluation value calculated from the content value and the area suitability is calculated as the evaluation reference value. In this case, examples of display target persons are a driver, an assistant-driver seat passenger, and a rear-seat passenger. For example, in the case of a content necessary during driving, the content value for a driver is relatively high. For example, in an area where the visual line movement during driving is small such as a head-up display, the area suitability for a driver is relatively high. In such a manner, a combination list is selected by evaluation values including a target evaluation value obtained from a content value and area suitability, so that an appropriate combination of contents and areas can be determined.

As an alternative, the content information may include a content characteristic indicative of a characteristic of the content. The area information includes an area characteristic indicative of a characteristic of the area. In the evaluation reference value calculating process, a total value of the evaluation values including a characteristic evaluation value calculated from the content characteristic and the area characteristic is calculated as the evaluation reference value. In this case, a combination list is selected by evaluation values including a content characteristic and an area characteristic, so that an appropriate combination of contents and areas can be determined.

As an alternative, the content characteristic may include a visual-line characteristic indicating whether a movement of a visual line of a driver is required or not. The area characteristic includes another visual-line characteristic indicating whether the movement of the visual line of the driver becomes larger or not. In this case, for example, a content which has to be frequently visually recognized during driving such as "vehicle speed" is a content requiring the movement of the visual line of the driver. An area where the movement of the visual line of a driver during driving is small such as a head-up display is an area in which the movement of the visual line of a driver does not become large. In such a manner, a combination list is selected on the basis of characteristic evaluation values related to the movement of the visual line of a driver.

As an alternative, the content characteristic may include an expression power characteristic indicating whether an expression power is required or not. The area characteristic includes another expression power characteristic indicating whether the expression power is large or not. In this case, for example, a content having a large information amount such as a "map" for navigation is a content requiring expression power (such as resolution or color display). For example, an area of a color liquid crystal display device mounted in the center of a vehicle is an area requiring large expression power. In such a manner, a combination list is selected on the basis of a characteristic evaluation value related to expression power.

As an alternative, the content characteristic may include an operation characteristic indicating whether an operation is required or not. The area characteristic includes another operation characteristic indicating whether the operation is permissible or not. In this case, for example, a content in which music piece selection or the like is performed like "audio information" is a content requiring operation. For example, the area of the liquid crystal display device integrated with a touch panel is an area in which operation can be performed. In such a manner, a combination list is selected on the basis of a characteristic evaluation value related to operability.

As an alternative, the display control apparatus may further include: a correspondence information storing unit storing correspondence information for deriving the characteristic evaluation value from the content characteristic and the area characteristic. In the evaluation reference value calculating process, the characteristic evaluation value is derived from the content characteristic and the area characteristic based on the correspondence information stored in the correspondence information storing unit. In this case, content characteristics and area characteristics are expressed step by step as numeric information, and a suitability table for obtaining suitability for deriving a characteristic evaluation value from both of the characteristic values is prepared as correspondence information. In such a manner, a characteristic evaluation value can be derived relatively easily from the content characteristic and the area characteristic.

As an alternative, the correspondence information of the correspondence information storing unit may be changeable according to a vehicle condition. In this case, for example, corresponding information for deriving a characteristic evaluation value is changed between a vehicle stop state and a vehicle driving state. In such a manner, a more appropriate characteristic evaluation value can be derived.

When a region required to display a content to an area becomes large, it becomes necessary to display a content while being scrolled or to reduce the size of a content and display the size-reduced content.

For example, as an alternative, the content information may include a content size as a size required for information display. The area information includes an area size as a size of the area. In the combination list extracting process, the area size and the content size are compared with each other, and a combination, in which the content fits in the area, is extracted as the combination list. In this case, it is unnecessary to display a content while being scrolled or to reduce the size of a content and display the size-reduced content, and information can be displayed so that it is easily grasped by the user.

In the case of extracting a combination list in accordance with the sizes as described above, by selecting a combination of areas and contents whose sizes match, a margin and the like is reduced, and information can be displayed so as to be easily grasped by the user.

For example, as an alternative, in the evaluation reference value calculating process, a total value of difference correspondence values obtained from a difference between the area size and the content size in each combination list may be calculated as the evaluation reference value. In this case, a marginal part around a content does not increase, and information can be displayed so as to be easily grasped by the user. The difference correspondence value may be the difference itself or may be calculated on the basis of the difference.

Some contents need to be essentially displayed or exclusively displayed. For example, in the case of "vehicle speed", at least one of analog display (meter display) and digital display (numeric display) is essential.

For example, as an alternative, the display control apparatus may further include: a content display information storing unit storing content display information for specifying an essential exclusion relation of the contents. In the content list generating process, the content list is generated according to the content display information stored in the content display information storing unit. In this case, a combination of contents and areas is determined with inclusion of an essential exclusion relation of contents, so that information can be displayed more appropriately.

As an alternative, the content display information may be an essential exclusion constraint equation indicating an essential exclusion relation of the contents expressed by predetermined operators. In the content list generating process, the content list is generated so as to satisfy the essential exclusion constraint equation. In this case, a combination of contents and areas can be determined with inclusion of the essential exclusion relation of contents.

Like a content, there may be situation that simultaneous use of one area and another area is not desired.

For example, as an alternative, the display control apparatus may further include: an area use information storing unit storing area usage information for specifying an essential exclusion relation of the areas. In the area list generating process, the area list is generated according to the area usage information stored in the area use information storing unit. In this case, contents are assigned to areas with inclusion of the essential exclusion relation of the areas, so that information can be displayed more appropriately.

As an alternatively, the area usage information may be an essential exclusion constraint equation indicating an essential exclusion relation of the areas expressed by predetermined operators. In the area list generating process, the area list is generated so as to satisfy the essential exclusion constraint equation. In this case, a combination of contents and areas can be determined with inclusion of the essential exclusion relation of areas.

When the number of contents increases, it becomes necessary to display them while dividing an area.

For example, as an alternative, the area managing unit may be capable of managing a predetermined area as a single area, is capable of managing the predetermined area as a plurality of area parts obtained by dividing the predetermined area, and has a hierarchical data structure, in which the plurality of area parts are positioned in a lower layer of the single area. In the combination list extracting process, usable areas are extracted based on the hierarchical data structure, so that the combination list is extracted. In this case, a parent-child relationship of areas can be easily determined.

Content information of a content may be changed on the basis of a vehicle state.

For example, as an alternative, the content managing unit may be capable of changing the content information based on a vehicle condition. In this case, for example, content information associated with a content is changed between a vehicle stop state and a vehicle driving state. In such a manner, a combination with a more appropriate area is determined.

Similarly, area information of an area may be changed on the basis of a vehicle state.

For example, as an alternative, the area managing unit may be capable of changing the area information based on a vehicle condition. In this case, for example, area information associated with an area is changed between a vehicle stop state and a vehicle driving state. In such a manner, a combination with a more appropriate area is determined.

As an alternative, the content managing unit may manage whether each content is an object to be displayed or not. In the content list generating process, the content list of contents as objects to be displayed is generated. In this case, for example, a flag indicative of a state of display/non-display is associated with each content. Such a flag may be set or reset in accordance with, for example, a vehicle condition. It may be set or reset in accordance with a user operation. Further, it may be set or reset in accordance with the presence/absence of a display request from a content. In this case, in the content list generating process, a content list is generated from contents as objects to be displayed. In such a manner, whether a content is an object to be displayed or not can be easily managed.

There is also a case where a proper area is predetermined depending on the kind of a content.

For example, as an alternative, the display control apparatus may further include: an assignment information storing unit storing assignment information of a specific content to a specific area. In the combination list extracting process, the combination list is extracted according to the assignment information stored in the assignment information storing unit. In this case, assignment information may be preset or can be arbitrarily set by the user. In such a manner, a content can be assigned to a more appropriate area, and designability can be assured. A desired content can be assigned to an area desired by the user.

As an alternative, the content managing unit may obtain the content via a network in the vehicle. Alternatively, the content managing unit may be capable of obtaining the content from an external device which is newly connected. In those cases, examples of the external device include a cellular phone such as a smart phone and an information terminal called a PDA. That is, by managing a content while associating a content with content information, a combination of contents and areas can be determined by the same algorithm regardless of the kind of the content.

Similarly, by managing an area while associating an area with area information, a combination of contents and areas can be determined by the same algorithm regardless of the kind of a display device.

For example, as an alternative, the area managing unit may manage the areas in a plurality of display devices. Alternatively, the area managing unit may update the areas to be managed when a part of the display devices is attached or detached. In those cases, for example, in a configuration where display devices have area information, by area information from a display device to be attached or detached, area information of an area to be managed is updated.

According to a second aspect of the present disclosure, a display control apparatus controls a display device mounted in a vehicle. The display device includes a screen having a plurality of areas set as display regions. The display control apparatus controls the display device so as to assign a content as an object to be displayed to at least one corresponding area. The display control apparatus includes: a content managing unit managing a content parameter associated with each content, each content parameter including at least a content evaluation value expressing a priority of display of the content or a content size expressing a size of display data; an assignment control unit generating a plurality of combination lists provided by the plurality of contents and the plurality of display areas; and an evaluation value obtaining unit obtaining a combination evaluation value corresponding to each combination list based on the content parameters. The assignment control unit selects one of the combination lists by comparing the combination evaluation value of each combination list.

In the display control apparatus, different from the case of simply assigning a priority like in the conventional technique, a combination list is selected from extracted combination lists and a combination of contents and areas is determined. Consequently, a content and an area can be combined so as to be appropriate in total.

As an alternative, the content parameter may include the content evaluation value. The evaluation value obtaining unit calculates, as the combination evaluation value, a total value of the content evaluation values corresponding to a plurality of contents for each of the combination lists. The assignment control unit compares the combination evaluation value of each combination list, and selects one of the combination lists having the largest combination evaluation value.

As an alternative, the display control apparatus may further include: an area managing unit storing an area parameter associated with a plurality of display areas. The area parameter includes an area evaluation value expressing an assignment priority of the content or an area size expressing a size of a display region of the area.

As an alternative, the area parameter may include the area evaluation value. The assignment control unit compares the content evaluation value with the area evaluation value. When a combination provides the content evaluation value larger than the area evaluation value, the assignment control unit determines that the content is capable of being displayed in the area and the content is capable of being assigned to the area.

As an alternative, the content parameter may include the content size. The area parameter includes the area size. The assignment control unit compares the content size and the area size in each of the combination lists. When the content size is smaller than the area size, the assignment control unit determines that the content is capable of being displayed in the area, and the content is capable of being assigned to the area.

As an alternative, the evaluation value obtaining unit calculates the combination evaluation value from the content parameter and the area parameter.

As an alternative, the assignment control unit compares the combination evaluation value in each combination list. The assignment control unit determines a combination of the contents and the areas by selecting one of the combination lists having the highest combination evaluation value.

As an alternative, the content parameter may include the content evaluation value. The area parameter includes the area evaluation value. The content evaluation value and the area evaluation value are set for each display target person as a display target in a compartment of the vehicle. The evaluation value obtaining unit calculates the combination evaluation value including a target evaluation value for each display target person based on the content evaluation value and the area evaluation value.

As an alternative, the content parameter may include a content characteristic, which is provided by at least one of a visual-line characteristic, an expression power characteristic and an operation characteristic. The area parameter includes an area characteristic corresponding to the content characteristic. The evaluation value obtaining unit calculates the combination evaluation value including a characteristic evaluation value based on the content characteristic and the area characteristic.

As an alternative, the content parameter may include the content evaluation value. The evaluation value obtaining unit calculates, as the combination evaluation value, a total value of the content evaluation values corresponding to a plurality of contents in each combination list. The assignment control unit compares the combination evaluation value of each combination list and selects one of the combination lists having a higher combination evaluation value.

As an alternative, the assignment control unit may compare the combination evaluation value of each combination list, The assignment control unit determines a combination of the contents and the areas by selecting one of the combination lists having a higher combination evaluation value.

The disclosure has been described according to the embodiments but it is noted that the disclosure is not limited to the embodiments and structures. The disclosure includes various modifications and also changes in the range of equivalency. In addition, various combinations and forms, further other combinations and forms including only one element, which may be more or less, are also within the scope of the disclosure and the scope of ideas.

The invention claimed is:

1. A display control apparatus for controlling a display device mounted in a vehicle, the display device including a screen having a plurality of areas set as display regions, and the display control apparatus controlling the display device so as to assign a content to a corresponding area and to display the content, the display control apparatus comprising:
   a content managing unit managing the content by associating content information as an attribute of the content with a corresponding content;
   an area managing unit managing the area by associating area information as an attribute of the area with a corresponding area; and
   a content assignment control unit determining a combination of the content managed by the content managing unit and the area managed by the area managing unit,
   wherein the content assignment control unit executes:
      a content list generating process for generating a content list according to contents managed by the content managing unit;
      an area list generating process for generating an area list as an available combination of the areas managed by the area managing unit;
      a combination list extracting process for extracting a combination of the areas and the contents as a combination list based on the area list and the content list;
      an evaluation reference value calculating process for calculating an evaluation reference value of each combination list based on the content information and the area information; and
      a combination determining process for comparing the combination lists to select one of the combination lists based on the evaluation reference value of each combination list, determining a combination of the contents and the areas, and displaying the selected one of the combination lists to a user.

2. The display control apparatus according to claim 1,
wherein the content information includes an information value indicative of a value of the content,
wherein the area information includes a region value indicative of a value of the area,
wherein, in the combination list extracting process, the information value and the region value are compared with each other, and a combination, in which the information value is larger than the region value, is extracted as the combination list.

3. The display control apparatus according to claim 2,
wherein, in the evaluation reference value calculating process, a total value of information values of the contents in each combination list is calculated as the evaluation reference value.

4. The display control apparatus according to claim 1,
wherein, in the evaluation reference value calculating process, a total value of evaluation values calculated from the content information and the area information is calculated as the evaluation reference value.

5. The display control apparatus according to claim 4,
wherein the content information includes a content value indicative of a value of information of each display target person,
wherein the area information includes an area suitability indicative of a suitability from a viewpoint of place of each display target person, and
wherein, in the evaluation reference value calculating process, the total value of the evaluation values including a target person evaluation value calculated from the content value and the area suitability is calculated as the evaluation reference value.

6. The display control apparatus according to claim 4,
wherein the content information includes a content characteristic indicative of a characteristic of the content,
wherein the area information includes an area characteristic indicative of a characteristic of the area and,
wherein, in the evaluation reference value calculating process, the total value of the evaluation values including a characteristic evaluation value calculated from the content characteristic and the area characteristic is calculated as the evaluation reference value.

7. The display control apparatus according to claim 6,
wherein the content characteristic includes a visual-line characteristic indicating whether a movement of a visual line of a driver is required or not, and
wherein the area characteristic includes another visual-line characteristic indicating whether the movement of the visual line of the driver becomes larger or not.

8. The display control apparatus according to claim 6,
wherein the content characteristic includes an expression power characteristic indicating whether an expression power is required or not, and
wherein the area characteristic includes another expression power characteristic indicating whether the expression power is large or not.

9. The display control apparatus according to claim 6,
wherein the content characteristic includes an operation characteristic indicating whether an operation is required or not, and
wherein the area characteristic includes another operation characteristic indicating whether the operation is permissible or not.

10. The display control apparatus according to claim 6, further comprising:
   a correspondence information storing unit storing correspondence information for deriving the characteristic evaluation value from the content characteristic and the area characteristic,
   wherein, in the evaluation reference value calculating process, the characteristic evaluation value is derived from the content characteristic and the area characteristic based on the correspondence information stored in the correspondence information storing unit.

11. The display control apparatus according to claim 10, wherein the correspondence information of the correspondence information storing unit is changeable according to a vehicle condition.

12. The display control apparatus according to claim 1, wherein the content information includes a content size as a size required for information display,
wherein the area information includes an area size as a size of the area, and
wherein, in the combination list extracting process, the area size and the content size are compared with each other, and a combination, in which the content fits in the area, is extracted as the combination list.

13. The display control apparatus according to claim 12, wherein, in the evaluation reference value calculating process, a total value of difference correspondence values obtained from a difference between the area size and the content size in each combination list is calculated as the evaluation reference value.

14. The display control apparatus according to claim 1, further comprising:
a content display information storing unit storing content display information for specifying an essential exclusion relation of the contents,
wherein, in the content list generating process, the content list is generated according to the content display information stored in the content display information storing unit.

15. The display control apparatus according to claim 14, wherein the content display information is an essential exclusion constraint equation indicating an essential exclusion relation of the contents expressed by predetermined operators, and
wherein, in the content list generating process, the content list is generated so as to satisfy the essential exclusion constraint equation.

16. The display control apparatus according to claim 1, further comprising:
an area use information storing unit storing area usage information for specifying an essential exclusion relation of the areas,
wherein, in the area list generating process, the area list is generated according to the area usage information stored in the area use information storing unit.

17. The display control apparatus according to claim 16, wherein the area usage information is an essential exclusion constraint equation indicating an essential exclusion relation of the areas expressed by predetermined operators, and
wherein, in the area list generating process, the area list is generated so as to satisfy the essential exclusion constraint equation.

18. The display control apparatus according to claim 1, wherein the area managing unit is capable of managing a predetermined area as a single area, is capable of managing the predetermined area as a plurality of area parts obtained by dividing the predetermined area, and has a hierarchical data structure, in which the plurality of area parts are positioned in a lower layer of the single area, and
wherein, in the combination list extracting process, usable areas are extracted based on the hierarchical data structure, so that the combination list is extracted.

19. The display control apparatus according to claim 1, wherein the content managing unit is capable of changing the content information based on a vehicle condition.

20. The display control apparatus according to claim 1, wherein the area managing unit is capable of changing the area information on the basis of a vehicle condition.

21. The display control apparatus according to claim 1, wherein the content managing unit manages whether each content is an object to be displayed or not and,
wherein, in the content list generating process, the content list of contents as objects to be displayed is generated.

22. The display control apparatus according to claim 1, further comprising:
an assignment information storing unit storing assignment information of a specific content to a specific area,
wherein, in the combination list extracting process, the combination list is extracted according to the assignment information stored in the assignment information storing unit.

23. The display control apparatus according to claim 1, wherein the content managing unit obtains the content via a network in the vehicle.

24. The display control apparatus according to claim 1, wherein the content managing unit is capable of obtaining the content from an external device, which is newly connected.

25. The display control apparatus according to claim 1, wherein the area managing unit manages the areas in a plurality of display devices.

26. The display control apparatus according to claim 25, wherein the area managing unit updates the areas to be managed when a part of the display devices is attached or detached.

27. A display control apparatus for controlling a display device mounted in a vehicle, the display device including a screen having a plurality of areas set as display regions, and the display control apparatus controlling the display device so as to assign a content as an object to be displayed to at least one corresponding area, the display control apparatus comprising:
a content managing unit managing a content parameter associated with each content, each content parameter including at least a content evaluation value expressing a priority of display of the content or a content size expressing a size of display data;
an assignment control unit generating a plurality of combination lists provided by the plurality of contents and the plurality of display areas; and
an evaluation value obtaining unit obtaining a combination evaluation value corresponding to each combination list based on the content parameters,
wherein the assignment control unit selects one of the combination lists by comparing the combination evaluation value of each combination list, and displays the selected one of the combination lists to a user.

28. The display control apparatus according to claim 27, wherein the content parameter includes the content evaluation value,
wherein the evaluation value obtaining unit calculates, as the combination evaluation value, a total value of the content evaluation values corresponding to a plurality of contents for each of the combination lists, and
wherein the assignment control unit compares the combination evaluation value of each combination list, and selects one of the combination lists having the largest combination evaluation value.

29. The display control apparatus according to claim 27, further comprising:
an area managing unit storing an area parameter associated with a plurality of display areas, wherein the area parameter includes an area evaluation value expressing an assignment priority of the content or an area size expressing a size of a display region of the area.

30. The display control apparatus according to claim 29, wherein the area parameter includes the area evaluation value,
wherein the assignment control unit compares the content evaluation value with the area evaluation value, and
wherein, when a combination provides the content evaluation value larger than the area evaluation value, the assignment control unit determines that the content is capable of being displayed in the area and the content is capable of being assigned to the area.

31. The display control apparatus according to claim 29, wherein the content parameter includes the content size, wherein the area parameter includes the area size, wherein the assignment control unit compares the content size and the area size in each of the combination lists, and
wherein, when the content size is smaller than the area size, the assignment control unit determines that the content is capable of being displayed in the area, and the content is capable of being assigned to the area.

32. The display control apparatus according to claim 29, wherein the evaluation value obtaining unit calculates the combination evaluation value from the content parameter and the area parameter.

33. The display control apparatus according to claim 32, wherein the assignment control unit compares the combination evaluation value in each combination list, and
wherein the assignment control unit determines a combination of the contents and the areas by selecting one of the combination lists having the highest combination evaluation value.

34. The display control apparatus according to claim 32, wherein the content parameter includes the content evaluation value,
wherein the area parameter includes the area evaluation value,
wherein the content evaluation value and the area evaluation value are set for each display target person as a display target in a compartment of the vehicle, and
wherein the evaluation value obtaining unit calculates the combination evaluation value including a target evaluation value for each display target person based on the content evaluation value and the area evaluation value.

35. The display control apparatus according to claim 32, wherein the content parameter includes a content characteristic, which is provided by at least one of a visual-line characteristic, an expression power characteristic and an operation characteristic,
wherein the area parameter includes an area characteristic corresponding to the content characteristic, and
wherein the evaluation value obtaining unit calculates the combination evaluation value including a characteristic evaluation value based on the content characteristic and the area characteristic.

36. The display control apparatus according to claim 32, wherein the assignment control unit compares the combination evaluation value of each combination list, and
wherein the assignment control unit determines a combination of the contents and the areas by selecting one of the combination lists having a higher combination evaluation value.

37. The display control apparatus according to claim 27, wherein the content parameter includes the content evaluation value,
wherein the evaluation value obtaining unit calculates, as the combination evaluation value, a total value of the content evaluation values corresponding to a plurality of contents in each combination list, and
wherein the assignment control unit compares the combination evaluation value of each combination list and selects one of the combination lists having a higher combination evaluation value.

* * * * *